United States Patent
Mun et al.

(10) Patent No.: US 12,456,529 B2
(45) Date of Patent: Oct. 28, 2025

(54) MEMORY DEVICE PERFORMING PROGRAM OPERATION

(71) Applicant: SK hynix Inc., Gyeonggi-do (KR)

(72) Inventors: Yeong Jo Mun, Gyeonggi-do (KR); Dong Hun Kwak, Gyeonggi-do (KR); Se Chun Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 172 days.

(21) Appl. No.: 18/359,904

(22) Filed: Jul. 27, 2023

(65) Prior Publication Data
US 2024/0265980 A1  Aug. 8, 2024

(30) Foreign Application Priority Data
Feb. 3, 2023  (KR) .................. 10-2023-0015065

(51) Int. Cl.
*G11C 16/34* (2006.01)
*G11C 11/56* (2006.01)
(Continued)

(52) U.S. Cl.
CPC ...... *G11C 16/3427* (2013.01); *G11C 11/5628* (2013.01); *G11C 11/5671* (2013.01);
(Continued)

(58) Field of Classification Search
CPC ............ G11C 16/3427; G11C 11/5628; G11C 11/5671; G11C 16/0483; G11C 16/10;
(Continued)

(56) References Cited

U.S. PATENT DOCUMENTS

2014/0003152 A1* 1/2014 Sharon .................. G11C 16/26
 365/185.18
2014/0376312 A1* 12/2014 Song ..................... G11C 16/10
 365/185.12
(Continued)

FOREIGN PATENT DOCUMENTS

KR  10-2008-0089426 A  10/2008
KR  10-2018-0013127 A  2/2018
(Continued)

OTHER PUBLICATIONS

Office Action for U.S. Appl. No. 18/300,958 issued by the USPTO on Mar. 25, 2025.

*Primary Examiner* — Amir Zarabian
*Assistant Examiner* — Justin Bryce Heisterkamp
(74) *Attorney, Agent, or Firm* — IP & T GROUP LLP

(57) ABSTRACT

A memory device includes: a memory block including a plurality of memory cells; a peripheral circuit for performing a program operation on selected memory cells among the plurality of memory cells; and a control logic for controlling the program operation of the peripheral circuit. The control logic controls the peripheral circuit to perform a foggy program operation on first memory cells connected to a first word line among the plurality of memory cells, perform a foggy program operation on second memory cells connected to a second word line adjacent to the first word line among the plurality of memory cells, and perform a fine program operation on the first memory cells, based on a target program state of the second memory cells.

22 Claims, 17 Drawing Sheets

(51) Int. Cl.
*G11C 16/04* (2006.01)
*G11C 16/10* (2006.01)
*G11C 16/24* (2006.01)

(52) U.S. Cl.
CPC .......... *G11C 16/0483* (2013.01); *G11C 16/10* (2013.01); *G11C 16/24* (2013.01); *G11C 16/34* (2013.01); *G11C 16/3418* (2013.01); *G11C 16/3459* (2013.01)

(58) Field of Classification Search
CPC ..... G11C 16/24; G11C 16/3459; G11C 16/34; G11C 16/08; G11C 16/3418; G11C 16/14
See application file for complete search history.

(56) References Cited

U.S. PATENT DOCUMENTS

| | | | | |
|---|---|---|---|---|
| 2015/0348633 | A1* | 12/2015 | Song | G11C 11/5628 365/185.19 |
| 2016/0055919 | A1* | 2/2016 | Park | G11C 16/0483 365/185.12 |
| 2018/0182463 | A1* | 6/2018 | Dutta | G06F 3/0619 |
| 2019/0088341 | A1* | 3/2019 | Jung | G11C 16/34 |
| 2021/0082497 | A1* | 3/2021 | Hara | G06F 3/0604 |
| 2021/0158867 | A1* | 5/2021 | Hara | G06F 3/0619 |
| 2022/0180940 | A1* | 6/2022 | Sharon | H01L 25/18 |
| 2022/0230685 | A1* | 7/2022 | Alrod | G11C 11/5671 |
| 2022/0328114 | A1* | 10/2022 | Chai | G11C 7/1039 |
| 2023/0031193 | A1* | 2/2023 | Na | G11C 16/08 |
| 2023/0141554 | A1* | 5/2023 | Oh | G11C 16/3454 711/154 |
| 2023/0238067 | A1* | 7/2023 | Zhao | G11C 16/12 365/185.22 |
| 2023/0253029 | A1* | 8/2023 | Murayama | G11C 11/4099 365/230.06 |
| 2023/0253050 | A1* | 8/2023 | Kim | G11C 16/3459 365/189.011 |
| 2023/0360705 | A1* | 11/2023 | Tseng | G11C 16/08 |
| 2024/0006004 | A1* | 1/2024 | Li | G11C 16/08 |
| 2024/0053903 | A1* | 2/2024 | Noda | G06F 3/0619 |
| 2024/0145009 | A1* | 5/2024 | Noh | G11C 16/32 |
| 2024/0161831 | A1* | 5/2024 | Jung | G11C 16/3459 |
| 2024/0170070 | A1* | 5/2024 | Qiu | G11C 16/102 |

FOREIGN PATENT DOCUMENTS

| | | |
|---|---|---|
| KR | 10-2018-0035492 A | 4/2018 |
| KR | 10-2019-0032904 A | 3/2019 |
| KR | 10-2021-0147947 A | 12/2021 |

* cited by examiner

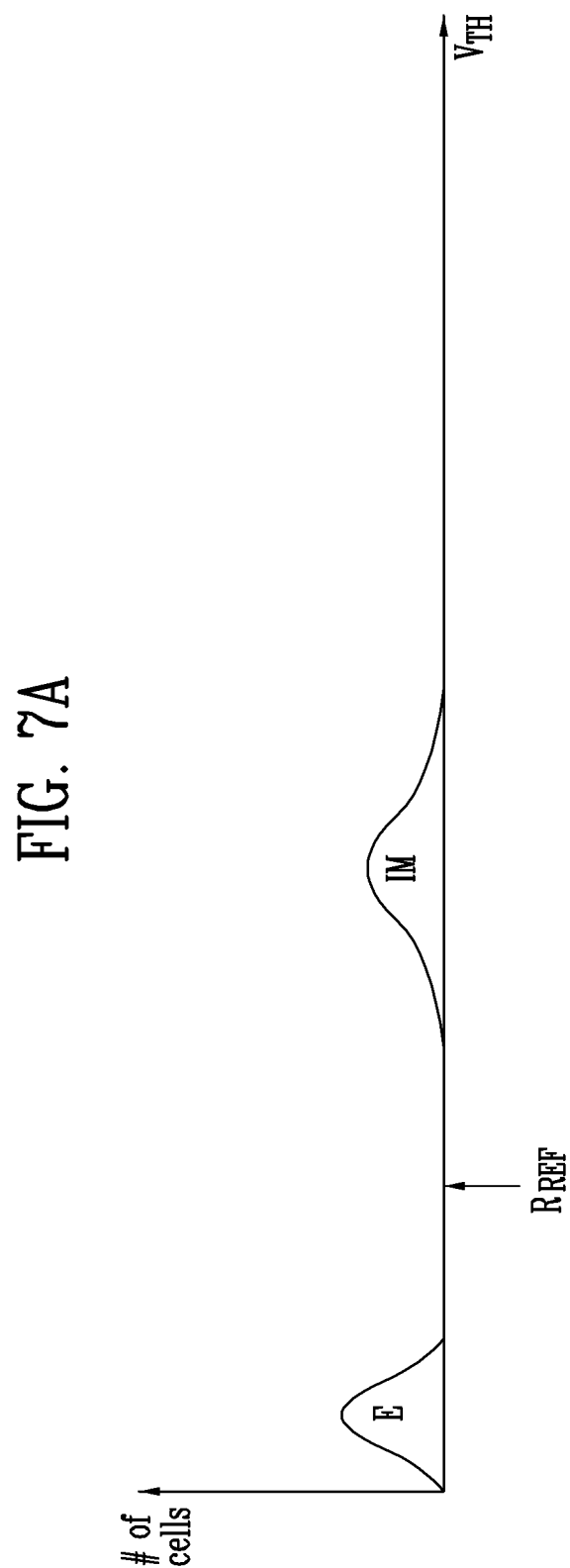

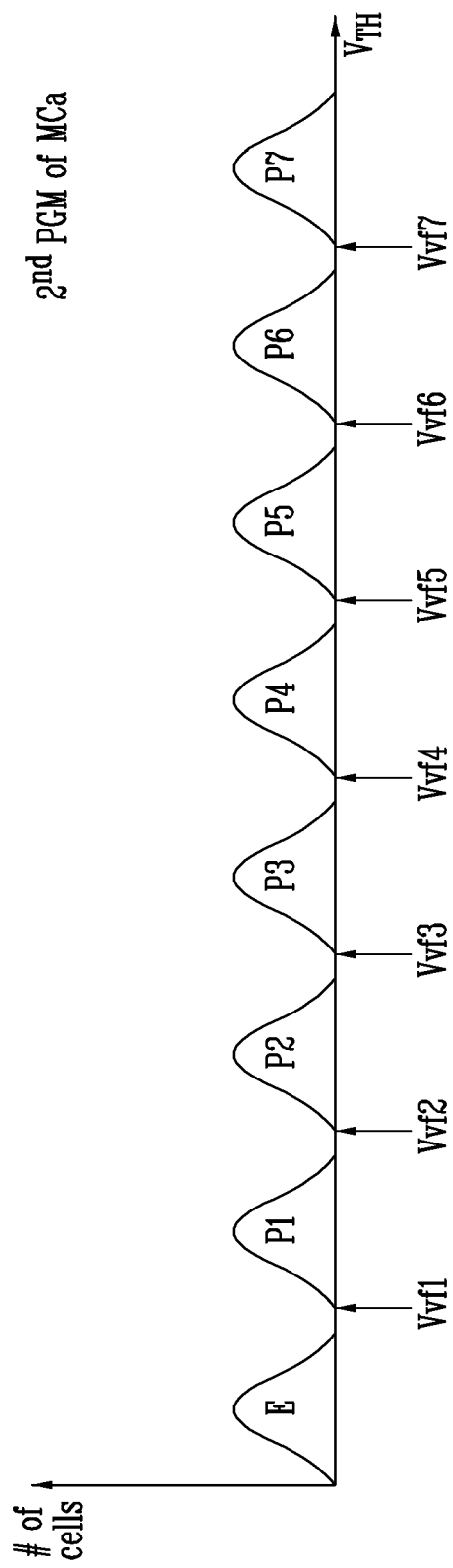

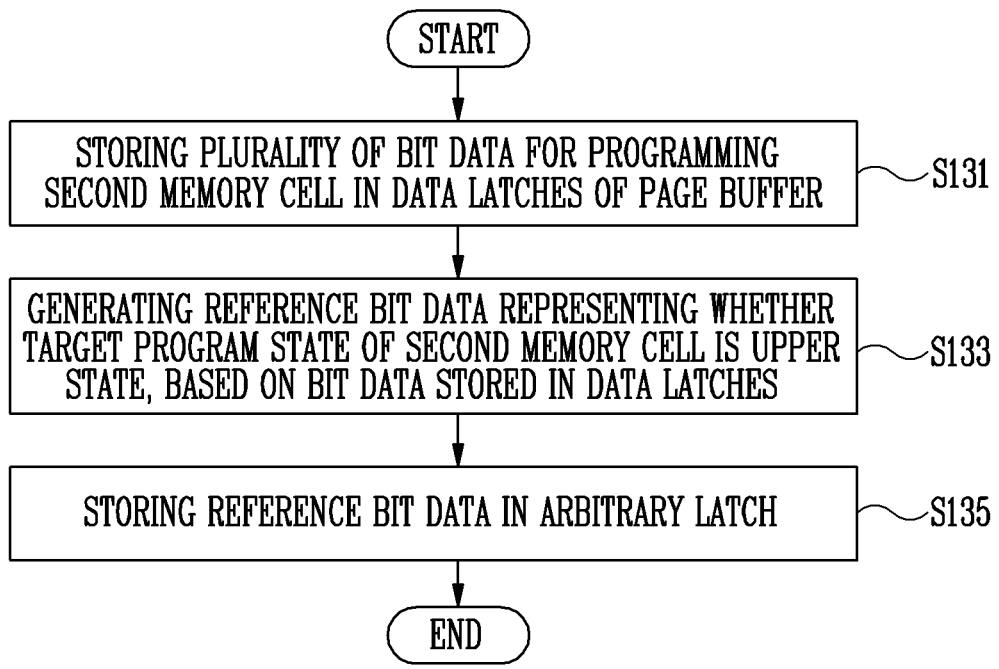
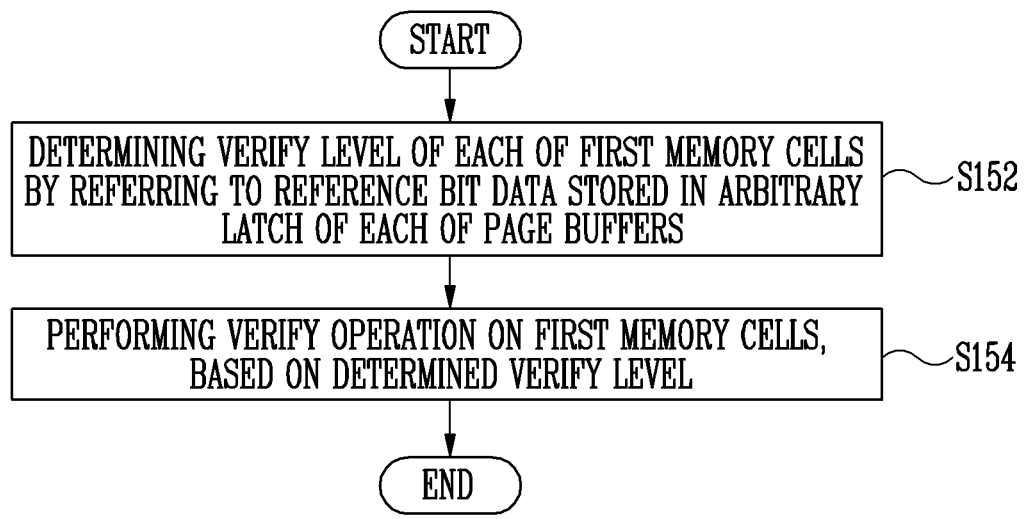

| LSB | 1 | 1 | 1 | 1 | 0 | 0 | 0 | 0 |
| --- | --- | --- | --- | --- | --- | --- | --- | --- |
| CSB | 1 | 0 | 0 | 1 | 1 | 1 | 0 | 0 |
| MSB | 1 | 1 | 0 | 0 | 0 | 1 | 1 | 0 |
| RBIT | 1 | 1 | 1 | 1 | 0 | 0 | 0 | 0 |

FIG. 15B

| LSB  | 1 | 1 | 1 | 1 | 0 | 0 | 0 | 0 |
|------|---|---|---|---|---|---|---|---|
| CSB  | 1 | 0 | 0 | 1 | 1 | 1 | 0 | 0 |
| MSB  | 1 | 1 | 0 | 0 | 0 | 1 | 1 | 0 |
| RBIT | 1 | 1 | 1 | 1 | 1 | 0 | 0 | 0 |

FIG. 15C

| LSB  | 1 | 1 | 1 | 1 | 0 | 0 | 0 | 0 |
|------|---|---|---|---|---|---|---|---|
| CSB  | 1 | 0 | 0 | 1 | 1 | 1 | 0 | 0 |
| MSB  | 1 | 1 | 0 | 0 | 0 | 1 | 1 | 0 |
| RBIT | 1 | 1 | 0 | 0 | 0 | 0 | 0 | 0 |

MEMORY DEVICE PERFORMING PROGRAM OPERATION

CROSS-REFERENCE TO RELATED APPLICATION

The present application claims priority under 35 U.S.C. § 119(a) to Korean patent application number 10-2023-0015065 filed on Feb. 3, 2023, the entire disclosure of which is incorporated by reference herein.

BACKGROUND

1. Field of Invention

Embodiments of the present disclosure generally relate to an electronic device, and more particularly, to a memory device performing a program operation.

2. Description of Related Art

A semiconductor memory device may be formed in a two-dimensional structure in which strings are arranged horizontally to a semiconductor substrate, or be formed in a three-dimensional structure in which strings are arranged vertically to a semiconductor substrate. A three-dimensional semiconductor memory device is a semiconductor memory device devised to overcome the limit of degree of integration of two-dimensional semiconductor memory devices, and may include a plurality of memory cells vertically stacked above a semiconductor substrate.

SUMMARY

Embodiments of the present disclosure are directed to a memory device capable of reducing a time required for programming while reducing program disturb.

In accordance with an embodiment of the present disclosure, there is provided a memory device including: a memory block including a plurality of memory cells; a peripheral circuit configured to perform a program operation on selected memory cells among the plurality of memory cells; and a control logic configured to control the program operation of the peripheral circuit, wherein the peripheral circuit performs the program operation by: performing a foggy program operation on first memory cells connected to a first word line among the plurality of memory cells; performing a foggy program operation on second memory cells connected to a second word line adjacent to the first word line among the plurality of memory cells; and performing a fine program operation on the first memory cells, based on a target program state of the second memory cells.

In accordance with another embodiment of the present disclosure, there is provided a memory device including: a first page including a first memory cell, the first page being connected to a first word line; a second page including a second memory cell adjacent to the first memory cell in a bit line direction, the second page being connected to a second word line; and a page buffer connected to the first and second memory cells through a bit line, wherein the page buffer is configured to store reference bit data representing whether a target program state of the second memory cell is an upper state during a foggy program operation on the second page.

In accordance with still another embodiment of the present disclosure, there is provided a method of operating a memory device, the method including: performing a foggy program operation on a first memory cell connected to a first word line; performing a foggy program operation on a second memory cell connected to a second word line adjacent to the first word line; and performing a fine program operation on the first memory cell, based on a target program state of the second memory cell.

In accordance with still another embodiment of the present disclosure, there is provided an operating method of a memory device, the operating method comprising: performing foggy program operations sequentially on respective first and second memory cells of a column and respective first and second rows adjacent to each other; and performing fine program operations sequentially on the respective first and second memory cells, wherein the fine program operation on the first memory cell is performed with lower verify voltage levels when the second memory cell is to be fine-programmed to have one of lower program states than when the second memory cell is to be fine-programmed to have one of higher program states.

In accordance with still another embodiment of the present disclosure, there is provided an operating method of a memory device, the operating method comprising: performing foggy program operations sequentially on respective first and second memory cells of a column and respective first and second rows adjacent to each other; and performing fine program operations sequentially on the respective first and second memory cells, wherein the fine program operation on the first memory cell is performed with a longer evaluation time when the second memory cell is to be fine-programmed to have one of lower program states than when the second memory cell is to be fine-programmed to have one of higher program states.

BRIEF DESCRIPTION OF THE DRAWINGS

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 7A, 7B, and 7C are diagrams illustrating a program method of the semiconductor memory device in accordance with an embodiment of the present disclosure.

FIG. 12 is a flowchart illustrating operation S130 shown in FIG. 8 in accordance with an embodiment of the present disclosure.

FIG. 13 is a flowchart illustrating operation S150 shown in FIG. 8 in accordance with an embodiment of the present disclosure.

FIG. 14 is a block diagram illustrating one of a plurality of page buffers included in the semiconductor memory device in accordance with an embodiment of the present disclosure.

FIGS. 15A, 15B, and 15C are truth tables illustrating an operation of a reference bit generator in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
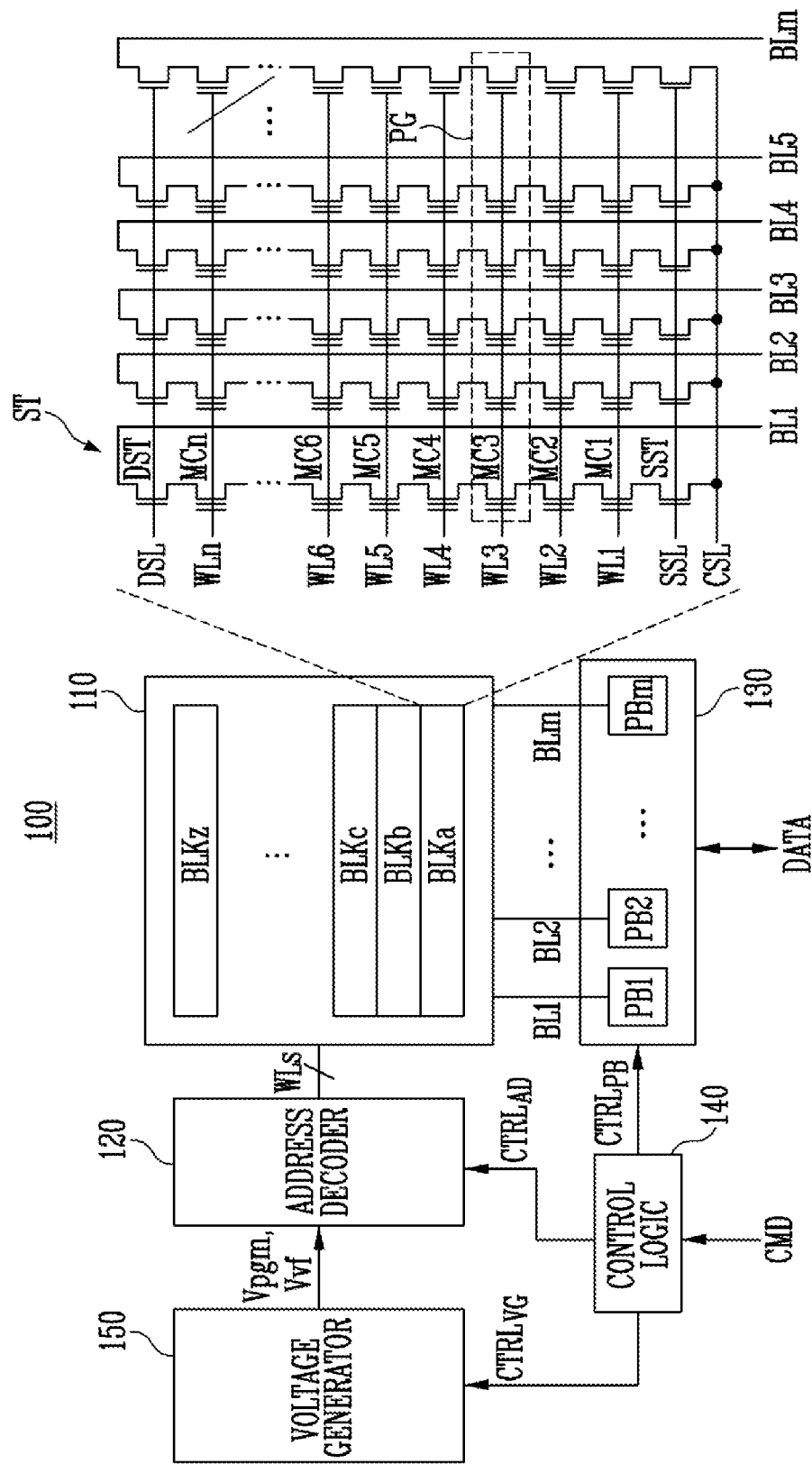
FIG. 1 is a block diagram illustrating a semiconductor memory device in accordance with an embodiment of the present disclosure.

FIG. 1 is a block diagram illustrating a semiconductor memory device 100 in accordance with an embodiment of the present disclosure.

Referring to FIG. 1, the semiconductor memory device 100 may include a memory cell array 110, an address decoder 120, a read/write circuit 130, a control logic 140, and a voltage generator 150.

The memory cell array 110 includes a plurality of memory blocks BLKa to BLKz. The plurality of memory blocks BLKa to BLKz are connected to the address decoder 120 through word lines WLs. The plurality of memory blocks BLKa to BLKz are connected to the read/write circuit 130 through bit lines BL1 to BLm. Each of the plurality of memory blocks BLKa to BLKz includes a plurality of memory cells. In an embodiment, the plurality of memory cells may be configured as nonvolatile memory cells.

A structure of a memory block BLKa among the plurality of memory blocks BLKa to BLKz included in the memory cell array 110 is illustrated in FIG. 1. Referring to FIG. 1, a plurality of word lines WL1 to WLn arranged in parallel to each other may be connected between a drain select line DSL and a source select line SSL. More specifically, the memory block BLKa may include a plurality of strings ST connected between the bit lines BL1 to BLm and a common source line CSL. The bit lines BL1 to BLm may be respectively connected to corresponding strings ST. The common source line CSL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MCn, and a drain select transistor DST, which are connected in series to each other between the common source line CSL and the first bit line BL1. At least one source select transistor SST and at least one drain select transistor DST may be included in one string ST.

A source of the source select transistor SST may be connected to the common source line CSL, and a drain of the drain select transistor DST may be connected to the first bit line BL1. The memory cells MC1 to MCn may be connected in series between the source select transistor SST and the drain select transistor DST. Gates of source select transistors SST included in different strings ST may be connected to the source select line SSL, gates of drain select transistors DST of the different strings ST may be connected to the drain select line DSL, and gates of memory cells MC1 to MCn of the different strings ST may be connected to the plurality of word lines WL1 to WLn. A group of memory cells connected to the same word line among the memory cells included in the different strings ST may be referred to as a physical page PG. Therefore, a number of physical pages PG corresponds to the number of the word lines WL1 to WLn that may be included in the memory block BLKa.

One memory cell may store one-bit data. This is generally designated as a single level cell (SLC). One physical page PG may store one logical page (LPG) data. One LPG data may include a number of data bits which corresponds to the number of cells included in one physical page PG.

One memory cell may store two-or-more-bit data. One physical page PG may store two or more LPG data.

Although the structure of a two-dimensional memory block is illustrated in FIG. 1, the present disclosure is not limited thereto. That is, each of the memory blocks BLKa to BLKz shown in FIG. 1 may be configured as a three-dimensional memory block.

The address decoder 120, the read/write circuit 130, and the voltage generator 150 operate as a peripheral circuit for driving the memory cell array 110. The peripheral circuit may perform a read operation, a write operation, and an erase operation on the memory cell array 110 under the control of the control logic 140. The address decoder 120 may be connected to the memory cell array 110 through word lines WLs. The address decoder 120 may operate under the control of the control logic 140. Specifically, the control logic 140 may transfer an address decoding control signal $CTRL_{AD}$ to the address decoder 120, and the address decoder 120 may perform a decoding operation, based on the address decoding control signal $CTRL_{AD}$.

Also, in a program operation, the address decoder 120 may apply a program voltage VPGM generated in the voltage generator 150 to a selected word line, and apply a program pass voltage to the other unselected word lines. Also, in a program verify operation, the address decoder 120 may apply a verify voltage Vvf generated in the voltage generator 150 to the selected word line, and apply a verify pass voltage to the other unselected word lines.

The read/write circuit 130 includes a plurality of page buffers PB1 to PBm. The read/write circuit 130 may operate as a "read circuit" in a read operation, and operate as a "write circuit" in a write operation. The plurality of page buffers PB1 to PBm are connected to the memory cell array 110 through the bit lines BL1 to BLm. The read/write circuit 130 may perform a read operation on received data DATA in response to a page buffer control signal $CTRL_{PB}$ output from the control logic 140.

The control logic 140 may be connected to the address decoder 120, the read/write circuit 130, and the voltage generator 150. The control logic 140 may receive a command CMD from the outside. The control logic 140 may control the address decoder 120, the read/write circuit 130, and the voltage generator 150 to perform an operation corresponding to the received command CMD. That is, the control logic 140 may control an operation of the voltage generator 150 through a voltage generation control signal $CTRL_{VG}$. Also, the control logic 140 may control an operation of the address decoder 120 through the address decoding control signal $CTRL_{AD}$. The control logic 140 may control operations of the page buffers PB1 to PBm in the read/write circuit 130 through the page buffer control signal $CTRL_{PB}$.

The voltage generator 150 may generate various operating voltages in response to a voltage generation control signal $CTRL_{VG}$ output from the control logic 140. For example, the voltage generator 150 may generate the program voltage VPGM used for a program operation and the verify voltage Vvf used for a program verify operation. Also, the voltage generator 150 may generate the program pass voltage and the verify pass voltage.

A program operation may be performed in units of pages. Memory cells commonly connected to one word line may constitute a physical page. In an embodiment, the physical page may include at least one logical page. Therefore, page data as data stored in the physical page may include at least one logical page data. For example, when the memory cells are programmed in an SLC mode, the physical page may include one logical page, and the page data may include one logical page data. Alternatively, when the memory cells are programmed in an MLC mode, the physical page may include two logical pages, and the page data may include two logical page data. The two logical page data may be Least Significant Bit (LSB) page data and Most Significant Bit (MSB) page data. Alternatively, when the memory cells are programmed in a TLC mode, the physical page may include three logical pages, and the page data may include three logical page data. The three logical page data may be Least Significant Bit (LSB) page data, Central Significant Bit (CSB) page data, and Most Significant Bit (MSB) page data.

Hereinafter, for convenience of description, a case where the memory cells are programmed in the TLC mode is described. However, this is for convenience of description, and the embodiment of the present disclosure is not limited thereto.

Before a program operation is performed, the memory cells may have a threshold voltage corresponding to an erase state. When the program operation is performed, each memory cell included in a selected page may have a threshold voltage corresponding to the erase state or a state among first to seventh program states according to data stored in each memory cell. Specifically, each memory cell may have, as a target program state, the erase state or a state among the first to seventh program states according to data to be stored in the memory cell. The program operation may be performed on each memory cell to have a threshold voltage of a corresponding target program state.

A conventional program operation was performed in a so-called one shot program method. The one shot program method may include a plurality of program loops. One program loop includes a program voltage apply phase of applying a program voltage to a selected word line and a verify phase of sensing whether a threshold voltage of each memory cell has reached a threshold voltage corresponding to a target program state. Whenever a program loop is performed, the magnitude of a program voltage applied to the selected word line may increase by a step voltage as compared with a program voltage in a previous program loop. The step voltage may be a predetermined voltage value. This is referred to as an Incremental Step Pulse Program (ISPP) scheme. When all memory cells connected to the selected word line do not reach the target program state even though program loops corresponding to a predetermined maximum loop number have been performed, it may be determined that the program operation has failed.

In accordance with an embodiment of the present disclosure, the program operation may include a first program operation and a second program operation. The first program operation may be an operation of allowing a threshold voltage of each memory cell to have a threshold voltage corresponding to one of the erase state and an intermediate state. The second program operation may be an operation of programming memory cells belonging to the erase state or the intermediate state such that a threshold voltage of each of the memory cells has a threshold voltage corresponding to a state among the erase state and the first to seventh program states. In such a program method, the number of threshold voltage distributions formed by memory cells is 2 when the first program operation is performed, and the number of threshold voltage distributions formed by memory cells is 8 when the second program operation is performed. Hence, the program method may be referred to as a 2-8 program scheme.

In this specification, the first program operation may be designated as a "foggy program operation." By the foggy program operation, a threshold voltage of each memory cell belongs to one of the erase state and the intermediate state. More specifically, by the foggy program operation, memory cells to be programmed to an upper state are programmed such that threshold voltages of the memory cells belong to the intermediate state. On the other hand, in the foggy program operation, threshold voltages of memory cells to be programmed to a lower state may maintain the erase state.

In this specification, the second program operation may be designated as a "fine program operation." By the fine program operation, a threshold voltage of each memory cell belongs to a state among the erase state and the first to seventh program states. More specifically, by the fine program operation, memory cells having threshold voltages corresponding to the intermediate state are programmed to belong to an upper state. In addition, by the fine program operation, memory cells having threshold voltages corresponding to the erase state are programmed to belong to a lower state.

In this specification, memory cells having a plurality of program states belonging to an upper state may have threshold voltages higher than threshold voltages of memory cells having a plurality of program states belonging to a lower state. The upper state and the lower state may be determined in various manners, if necessary. In an example, it may be determined that the fourth to seventh program states become upper states, and the erase state and the first to third program states become lower states. In another example, it may be determined that the fifth to seventh program states become upper states, and the erase state and the first to fourth program states become lower states. In still another example, it may be determined that the third to seventh program states become upper states, and the erase state and the first and second program states become lower states.

Figure 2:
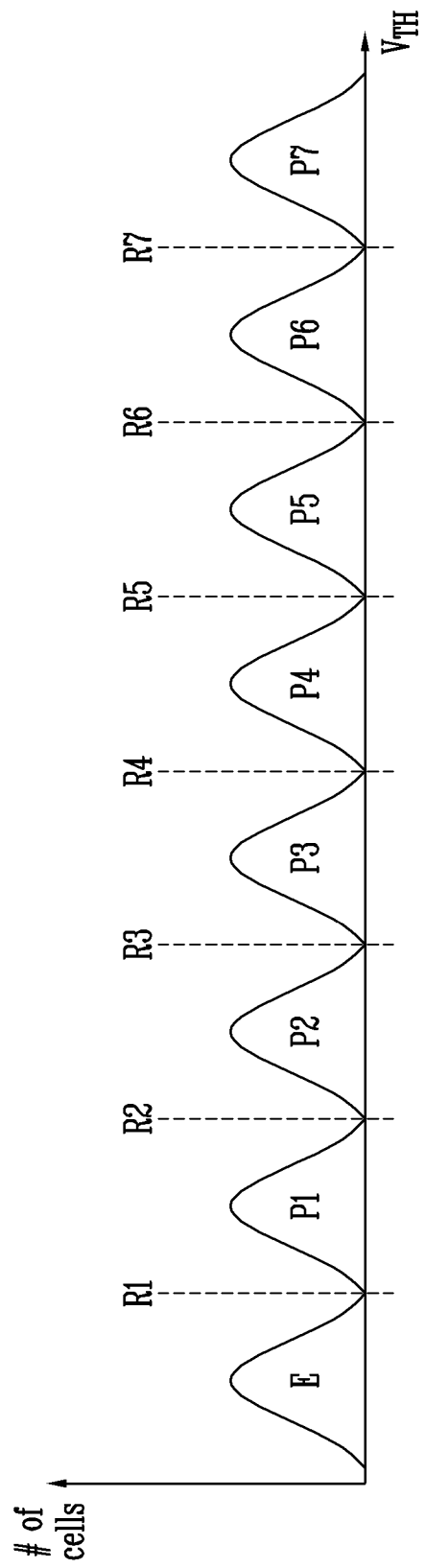
FIG. 2 is a diagram illustrating a threshold voltage distribution of TLCs in accordance with an embodiment of the present disclosure.

FIG. 2 is a diagram illustrating a threshold voltage distribution of TLCs in accordance with an embodiment of the present disclosure.

Referring to FIG. 2, the horizontal axis of each graph represents magnitude of threshold voltage, and the vertical axis of each graph represents a number of memory cells.

Before a program operation is performed, a memory cell may have a threshold voltage corresponding to an erase state E. After the program operation is completed, each memory cell may have a threshold voltage of one of the erase state E and first to seventh program states P1 to P7.

After data is stored in a memory cell, an operation of reading the stored data may be an operation of sensing memory cells by using a read voltage for distinguishing states from each other.

A first read voltage R1 may be a voltage for distinguishing the erase state E and the first program state P1. Since a memory cell having a threshold voltage corresponding to the erase state E has a threshold voltage lower than the first read voltage R1, the memory cell may be read as an on-cell. Since a memory cell having the first program state P1 has a threshold voltage higher than the first read voltage, the memory cell may be read as an off-cell.

Second to seventh read voltages R2 to R7 may be read voltages for distinguishing the first to seventh program states P1 to P7 from each other. The second read voltage R2 may be a read voltage for distinguishing the first program state P1 and the second program state P2 from each other. The third read voltage R3 may be a read voltage for distinguishing the second program state P2 and the third program state P3 from each other. In the same manner, the seventh read voltage R7 may be a read voltage for distinguishing the sixth program state P6 and the seventh program state P7 from each other.

As the number of data bits stored in one memory cell increases, the number of program states and the number of read voltages for distinguishing the program states from each other may increase.

Figure 3A:
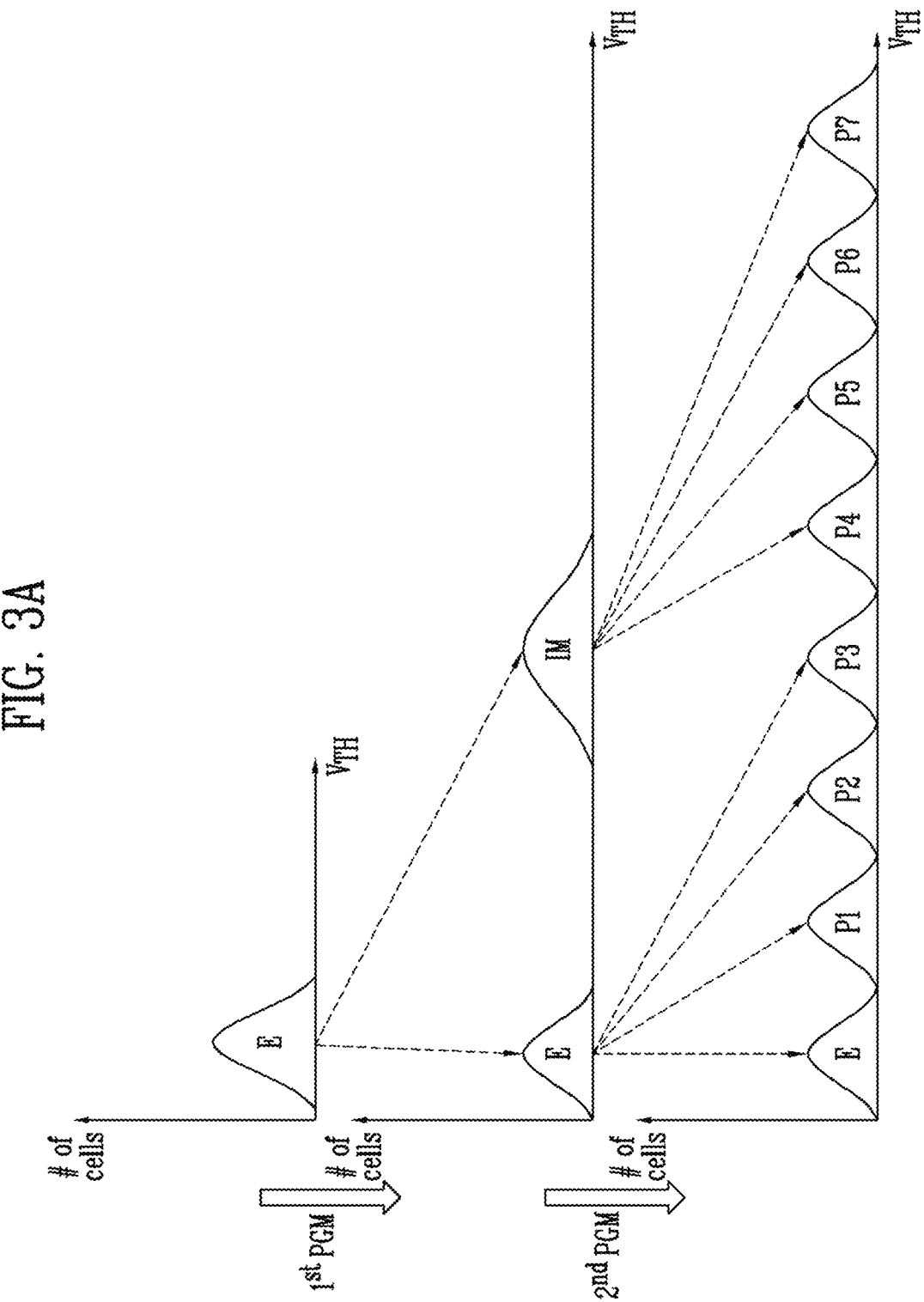
FIGS. 3A and 3B are diagrams illustrating a program operation in accordance with an embodiment of the present disclosure.
Figure 3B:
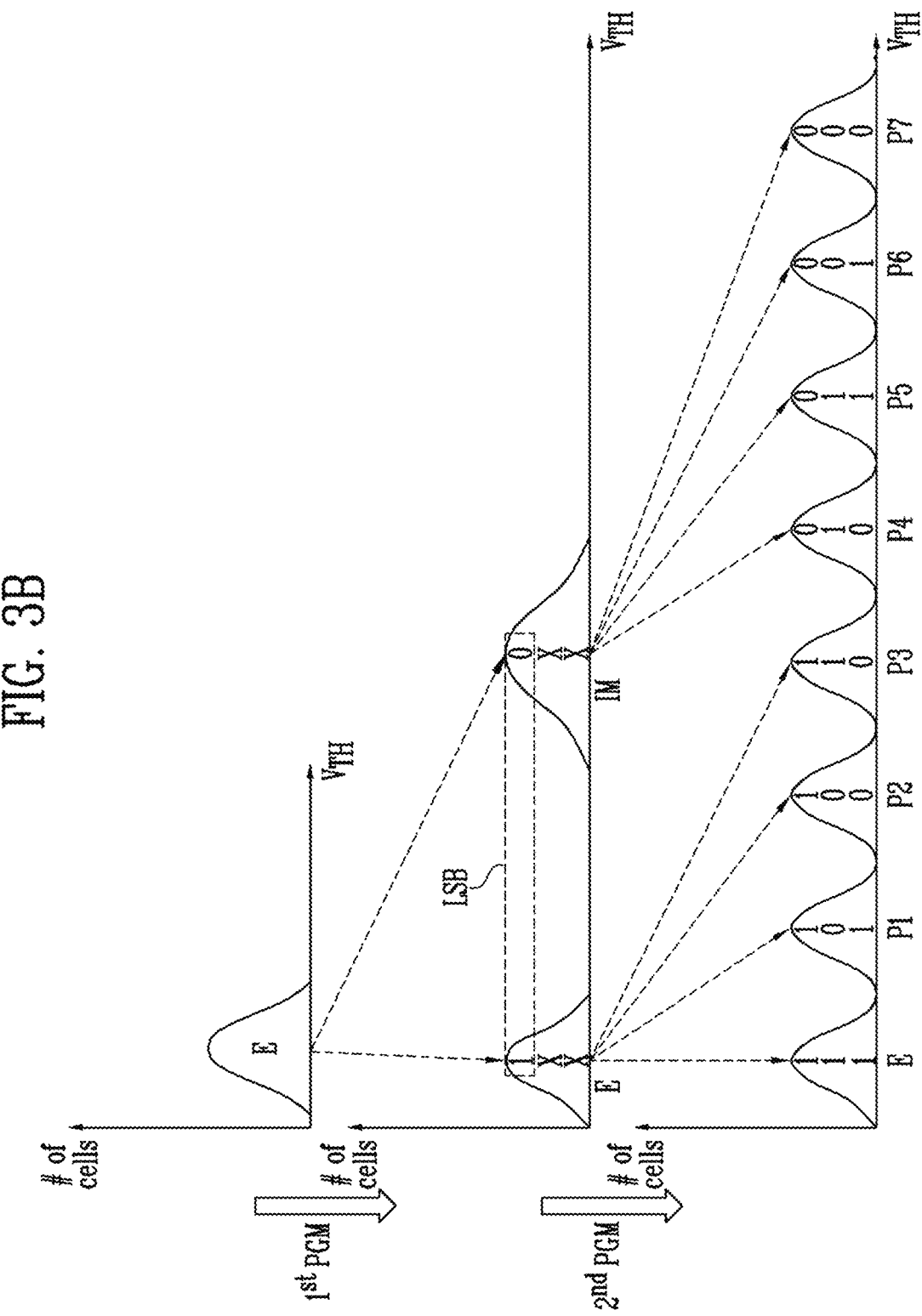

FIGS. 3A and 3B are diagrams illustrating a program operation in accordance with an embodiment of the present disclosure.

Referring to FIGS. 3A and 3B, a first program operation $1^{st}$ PGM may be an operation of programming memory cells connected to a selected word line such that a threshold voltage of each of the memory cells has a threshold voltage corresponding to one of an erase state E and an intermediate state IM according to data to be stored in each memory cell. In an embodiment, a threshold voltage corresponding to the intermediate state IM may be higher than a threshold voltage corresponding to the erase state E. In an embodiment, memory cells to be programmed to the intermediate state IM in the first program operation $1^{st}$ PGM may be memory cells of which a target program state is one state among fourth to seventh program states P4 to P7. On the contrary, a target program state of memory cells to maintain the erase state E in the first program operation $1^{st}$ PGM may be one state among the erase state E and first to third program states P1 to P3.

In an embodiment, the first program operation $1^{st}$ PGM may be an operation of providing the memory cells with a fixed program voltage having a predetermined magnitude at least once. That is, a simplest form of the first program operation $1^{st}$ PGM may be an operation of providing the fixed program voltage to the word line once. In an embodiment, the first program operation $1^{st}$ PGM may include a plurality of program loops. Although the program loops included in the first program operation $1^{st}$ PGM are performed, the level of a program voltage applied to the word line does not increase, and the program voltage may be a fixed program voltage having a fixed voltage level. In an embodiment, the first program operation $1^{st}$ PGM may be a program operation in which no verify phase is performed. In another embodiment, a verify phase may be performed during the first program operation $1^{st}$ PGM.

While the fixed program voltage is applied to the word line, one of a program allow voltage and a program inhibit voltage may be applied to bit lines to which selected memory cells are respectively connected. For example, a threshold voltage of a memory cell to which the program allow voltage is applied may have a voltage corresponding to the intermediate state IM as the fixed program voltage is applied. On the contrary, a threshold voltage of a memory cell to which the program inhibit voltage is applied may maintain the erase state E.

A second program operation $2^{nd}$ PGM may be an operation of allowing each of memory cells having threshold voltages corresponding to the erase state E and the intermediate state IM to have a threshold voltage corresponding to a target program state.

When the second program operation $2^{nd}$ PGM is performed, each memory cell maintaining the erase state E in the first program operation $1^{st}$ PGM may have a threshold voltage corresponding to a state among the first to third program states P1 to P3. Alternatively, each memory cell programmed to the intermediate state IM in the first program operation $1^{st}$ PGM may have a threshold voltage corresponding to a state among the fourth to seventh program states P4 to P7.

Referring to FIG. 3B, after the second program operation $2^{nd}$ PGM is performed, a memory cell corresponding to the erase state E may store data of "111," and memory cells corresponding to the first to seventh program states P1 to P7 may store data of "101," "100," "110," "010," "011," "001," and "000," respectively. Therefore, when the first program operation $1^{st}$ PGM is performed, memory cells corresponding to the erase state E may be memory cells to store one of data of "111," "101," "100," and "110" after the second program operation $2^{nd}$ PGM is subsequently performed, and memory cells corresponding to the intermediate state IM may be memory cells to store data of "010," "011," "001," and "110" after the second program operation $2^{nd}$ PGM is subsequently performed.

That is, the erase state E and the intermediate state IM may be states distinguished using only LSB page data of page data. This means that the first program operation $1^{st}$ PGM can be performed using only LSB page data.

Hereinafter, a read operation of reading data of memory cells which have been completely programmed will be described in more detail.

Figure 4A:
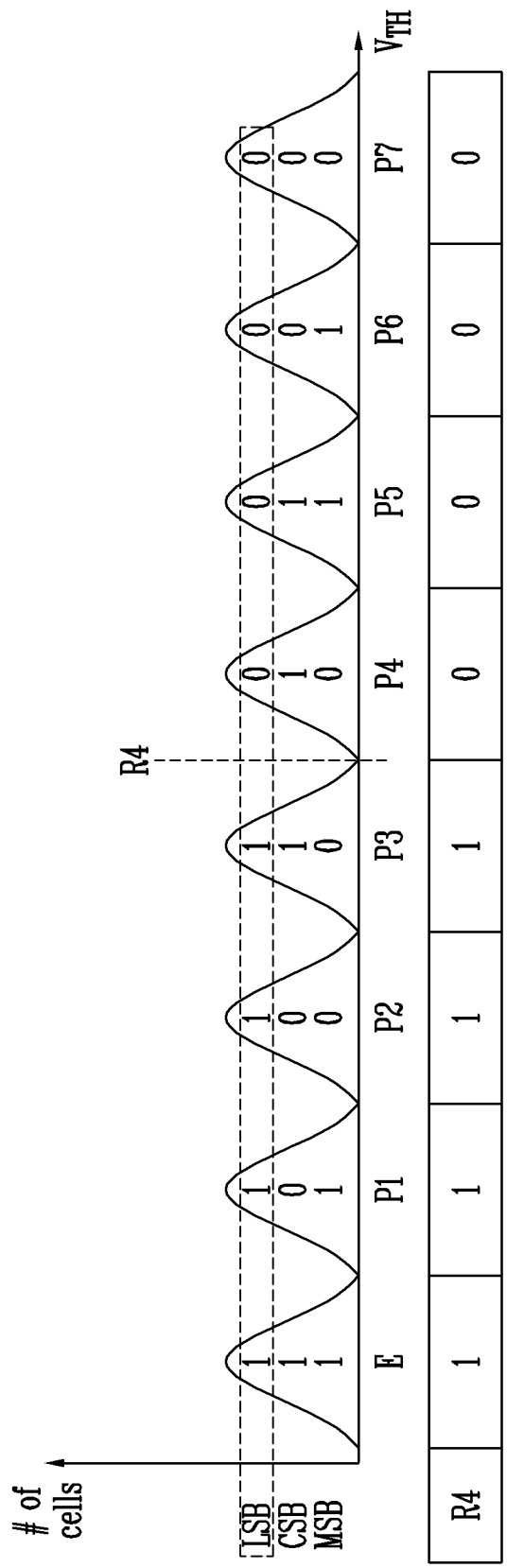
FIGS. 4A to 4C are diagrams illustrating data stored in memory cells and a read method in accordance with an embodiment of the present disclosure.
Figure 4B:
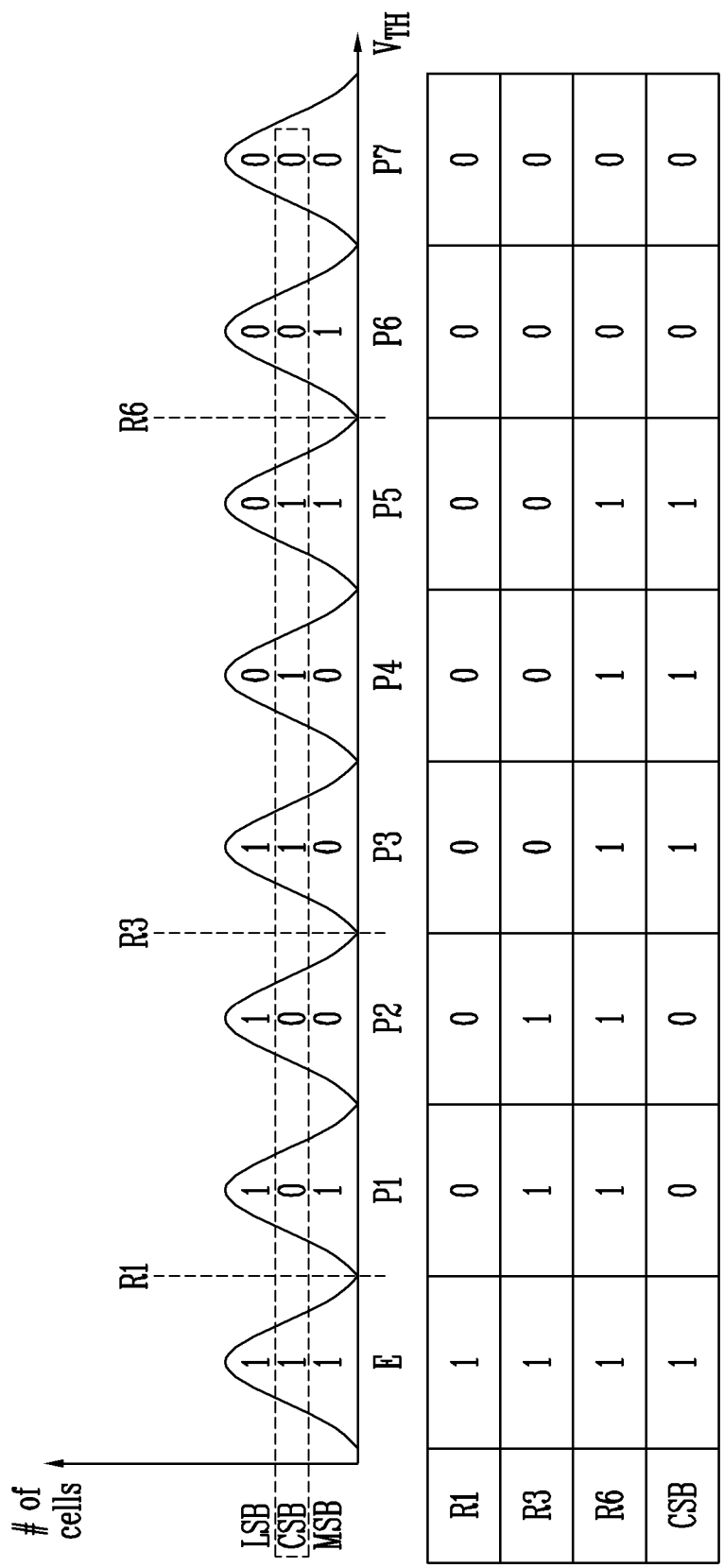
Figure 4C:
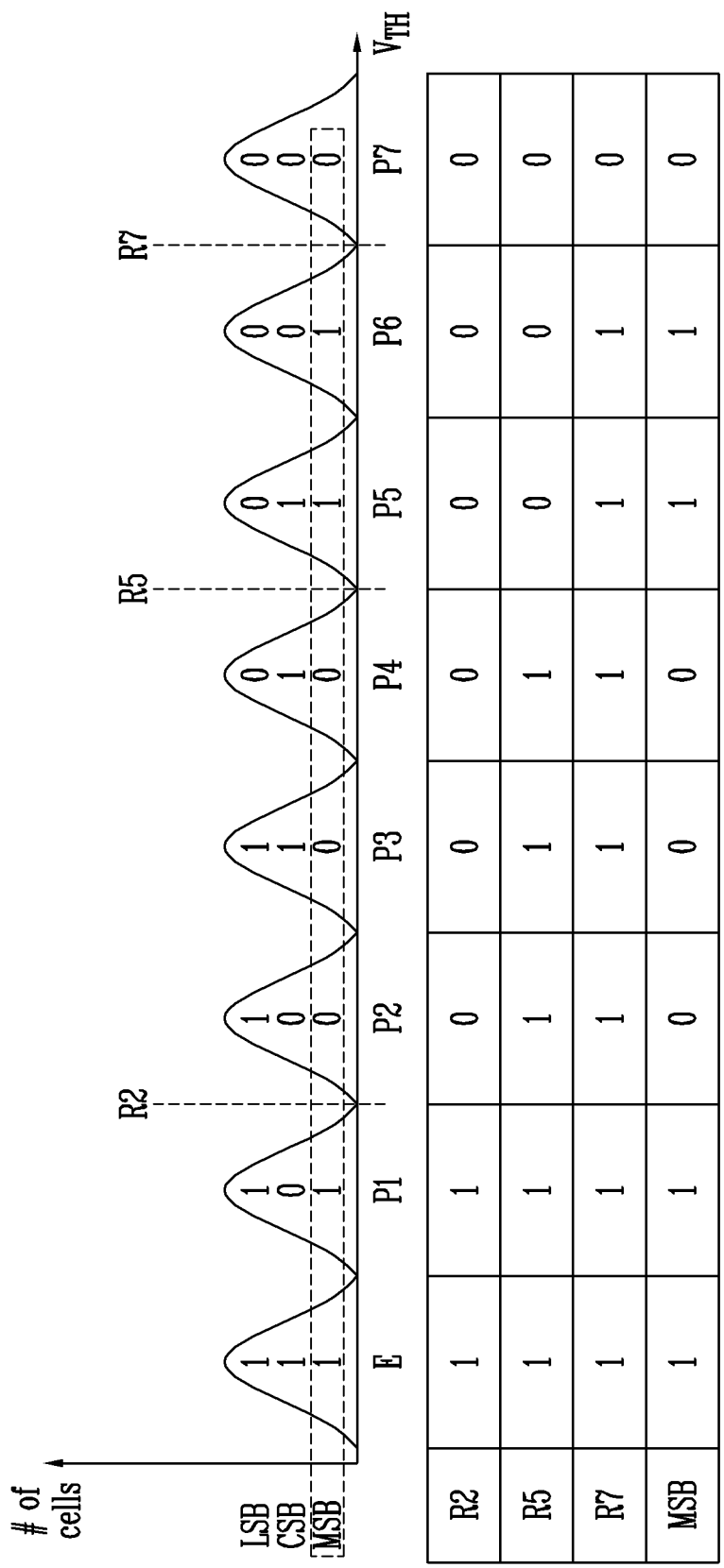

FIGS. 4A to 4C are diagrams illustrating data stored in memory cells and a read method in accordance with an embodiment of the present disclosure.

FIG. 4A is a diagram illustrating an operation of reading LSB page data.

In the case of the program operation described with reference to FIGS. 3A and 3B, the first program operation $1^{st}$ PGM may be performed using only LSB page data. To this end, the LSB page data is to be divided according to one read voltage. As the divided result, a number of target program states of memory cells of which LSB page data is "1" and a number of target program states of memory cells of which LSB page data is "0" are similar to each other, which may be help in reliability.

Therefore, by considering this, when LSB page data can be read through one-time sensing using a fourth read voltage R4 as shown in FIG. 4A, the program operation described with reference to FIGS. 3A and 3B may be performed.

LSB page data of memory cells corresponding to the erase state E and the first to third program states P1 to P3 may be "1," and LSB page data of memory cells corresponding to the fourth to seventh program states P4 to P7 may be "0."

FIG. 4B is a diagram illustrating an operation of reading CSB page data.

Referring to FIG. 4B, CSB page data may be acquired through sensing using a first read voltage R1, a third read voltage R3, and a sixth read voltage R6.

Specifically, CSB data of a memory cell decided as an on-cell by the first read voltage R1 may be "1." CSB data of memory cells which are decided as off-cells by the first read voltage R1 and are decided as on-cells by the third read voltage R3 may be "0." CSB data of memory cells which are decided as off-cells by the third read voltage R3 and are decided as on-cells by the sixth read voltage R6 may be "1." CSB data of memory cells decided as off-cells by the sixth read voltage R6 may be "0."

FIG. 4C is a diagram illustrating an operation of reading MSB page data in accordance with an embodiment of the present disclosure.

Referring to FIG. 4C, MSB page data may be acquired through three-time sensing operations according to different read voltages.

Specifically, the MSB page data may be acquired through sensing using a second read voltage R2, a fifth read voltage R5, and a seventh read voltage R7. MSB data of a memory cell decided as an on-cell by the second read voltage R2 may be "1." MSB data of memory cells which are decided as off-cells by the second read voltage R2 and are decided as on-cells by the fifth read voltage R5 may be "0." MSB data of memory cells which are decided as off-cells by the fifth read voltage R5 and are decided as on-cells by the seventh read voltage R7 may be "1." MSB data of memory cells decided as off-cells by the seventh read voltage R7 may be "0."

A gray code described with reference to FIGS. 4A to 4C is merely illustrative, and various different types of gray codes may be used, if necessary.

Figure 5:
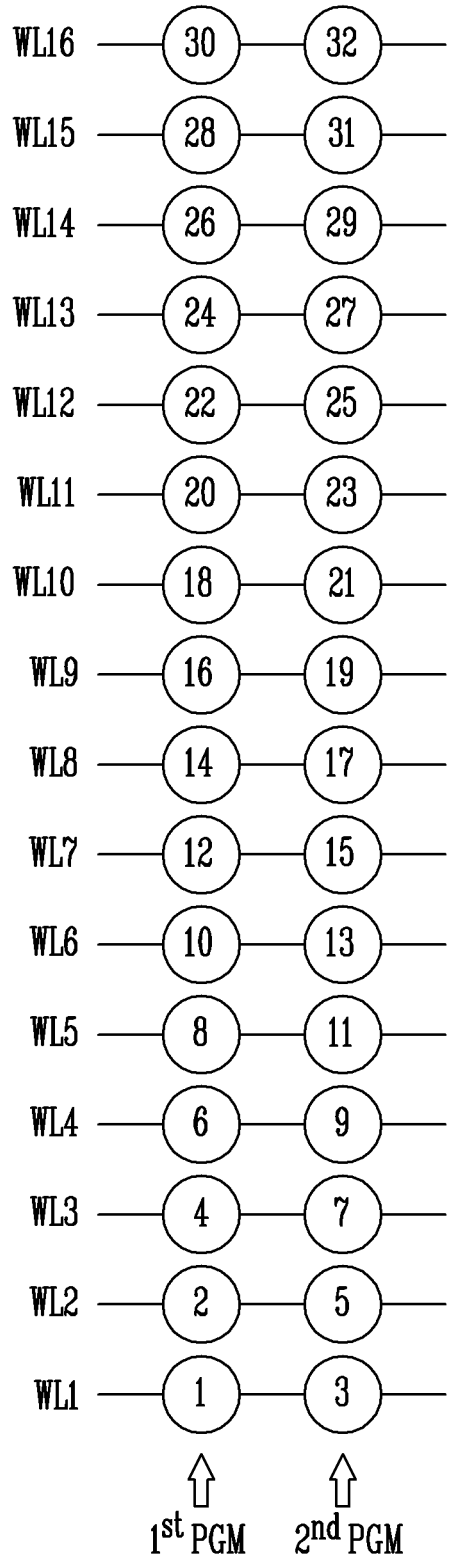
FIG. 5 is a diagram illustrating an order in which first and second program operations are performed on each of physical pages in accordance with an embodiment of the present disclosure.

FIG. 5 is a diagram illustrating an order in which first and second program operations are performed on each of physical pages in accordance with an embodiment of the present disclosure.

Referring to FIG. 5, an order in which a first program operation $1^{st}$ PGM and a second program operation $2^{nd}$ PGM are performed on each of physical pages connected to first to sixteenth word lines WL1 to WL16 are indicated by numbers in circles. In order to minimize influence of program disturb on memory cells of an adjacent page during the second program operation $2^{nd}$ PGM, an order of the whole program operation may be determined such that the second program operation $2^{nd}$ PGM on an adjacent physical page is performed after the first program operation $1^{st}$ PGM on the corresponding physical page is completed.

First, the first program operation $1^{st}$ PGM on a physical page connected to the first word line WL1 is firstly performed. After that, the second program operation $2^{nd}$ PGM on the physical page connected to the first word line WL1 is not performed, but the first program operation $1^{st}$ PGM on a physical page connected to the second word line WL2 is secondly performed. After that, the second program operation $2^{nd}$ PGM on the physical page connected to the first word line WL1 is thirdly performed.

After that, the first program operation $1^{st}$ PGM on a physical page connected to the third word line WL3 is fourthly performed, and the second program operation $2^{nd}$ PGM on the physical page connected to the second word line WL2 is fifthly performed. Generally speaking, it can be seen that the first program operation $1^{st}$ PGM on an (i+1)th word line WL(i+1) is performed before the second program operation $2^{nd}$ PGM on an ith word line WLi is performed.

Figure 6:
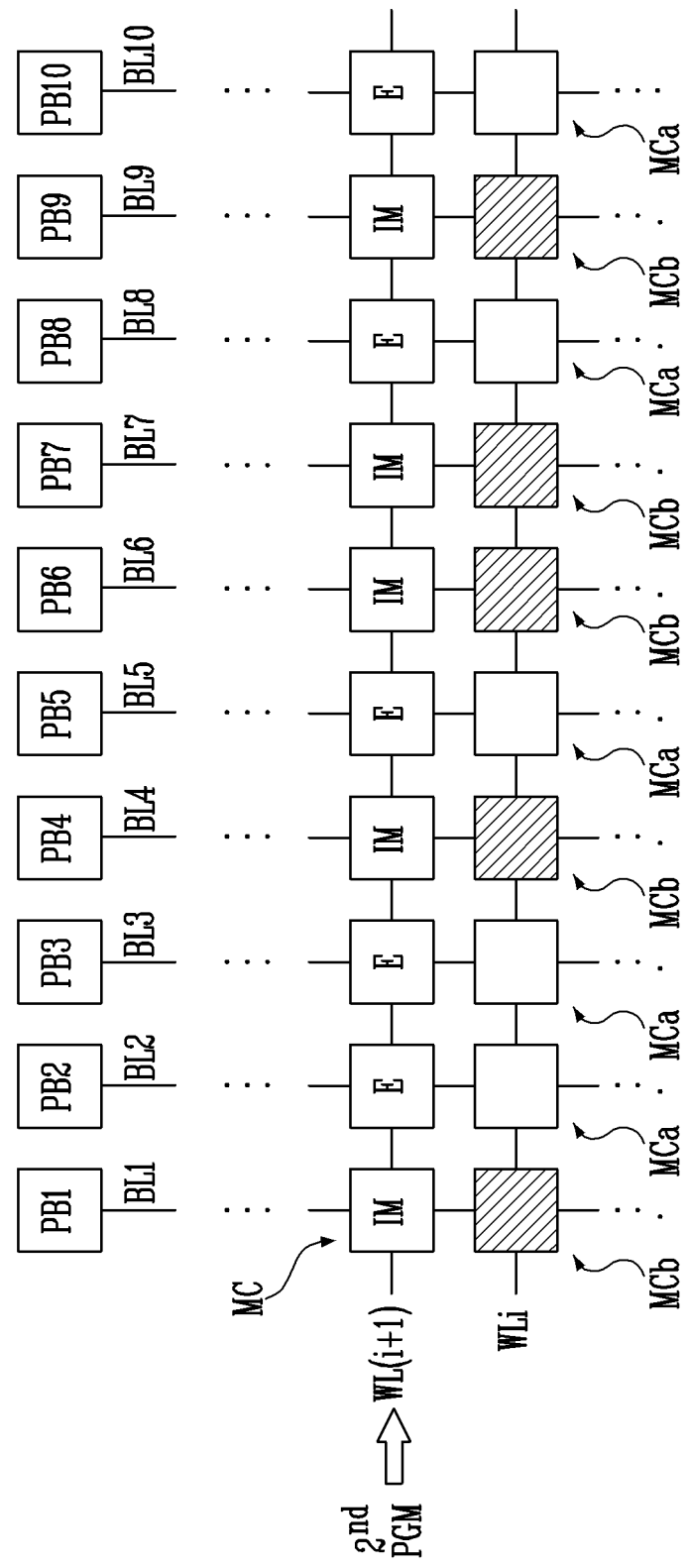
FIG. 6 is a diagram illustrating influence of program disturb in the second program operation of adjacent memory cells in accordance with an embodiment of the present disclosure.

FIG. 6 is a diagram illustrating influence of program disturb in the second program operation of adjacent memory cells in accordance with an embodiment of the present disclosure. FIG. 6 is a diagram illustrating disturb applied to memory cells connected to an ith word line WLi in the second program operation $2^{nd}$ PGM on a physical page connected to an (i+1)th word line WL(i+1) in a state in which the first program operation $1^{st}$ PGM and the second program operation $2^{nd}$ PGM on a physical page connected to the ith word line WLi are completed, and the first program operation $1^{st}$ PGM on a physical page connected to the (i+1)th word line WL(i+1) is completed.

For convenience of description, only memory cells MC connected to the ith word line WLi and the (i+1)th word line WL(i+1) among memory cells included in a memory block are illustrated. Referring to FIG. 6, each of the memory cells may be connected to a corresponding one of first to tenth bit lines BL1 to BL10, and the first to tenth bit lines BL1 to BL10 are connected to respective first to tenth page buffers PB1 to PB10.

As described above, the first program operation $1^{st}$ PGM and the second program operation $2^{nd}$ PGM on the physical page connected to the ith word line WLi are completed, and the first program operation $1^{st}$ PGM on the physical page connected to the (i+1)th word line WL(i+1) is completed. A result of the first program operation $1^{st}$ PGM on memory cells MC connected to the (i+1)th word line WL(i+1) is illustrated in quadrangles representing the respective memory cells.

For example, a memory cell connected to the first bit line BL1 among the memory cells MC connected to the (i+1)th word line WL(i+1) is programmed to the intermediate state IM as a result of the first program operation $1^{st}$ PGM. In addition, a memory cell connected to the second bit line BL2 among the memory cells MC connected to the (i+1)th word line WL(i+1) maintains the erase state E as a result of the first program operation $1^{st}$ PGM. Like this, each of the memory cells connected to the fourth, sixth, seventh, and ninth bit line BL4, BL6, BL7, and BL9 among the memory cells MC connected to the (i+1)th word line WL(i+1) is programmed to the intermediate state IM as a result of the first program operation $1^{st}$ PGM. In addition, like this, each of the memory cells connected to the third, fifth, eighth, and tenth bit lines BL3, BL5, BL8, and BL10 among the memory cells MC connected to the (i+1)th word line WL(i+1) maintains the erase state E as a result of the first program operation $1^{st}$ PGM.

As described above, the memory cells programmed to the intermediate state IM by the first program operation $1^{st}$ PGM may be programmed to an upper state by the subsequent second program operation $2^{nd}$ PGM. The memory cells maintaining the erase state E by the first program operation $1^{st}$ PGM may be programmed to a lower state by the subsequent second program operation $2^{nd}$ PGM. Memory cells adjacent in a bit line direction to a memory cell to be programmed to an upper state by the second program operation $2^{nd}$ PGM are relatively largely influenced by disturb. This means that, in FIG. 6, memory cells MCb indicated by slashed quadrangles among memory cells connected to the ith word line WLi are largely influenced by disturb as compared with memory cells MCa which are not indicated by the slashed quadrangles. After the second program operation $2^{nd}$ PGM on memory cells connected to the (i+1)th word line WL(i+1) is completed, a threshold voltage of the memory cell MCb may have relatively increased by disturb as compared with a threshold voltage of the memory cell MCa.

In accordance with an embodiment of the present disclosure, in order to reduce influence caused by selective disturb, a verify level of the memory cell MCb may become low in the second program operation $2^{nd}$ PGM of the memory cells connected to the ith word line WLi. Accordingly, influence of disturb, which is applied to the memory cell MCb during the second program operation $2^{nd}$ PGM of the memory cells connected to the (i+1)th word line WL(i+1), can be cancelled.

Figure 7C:
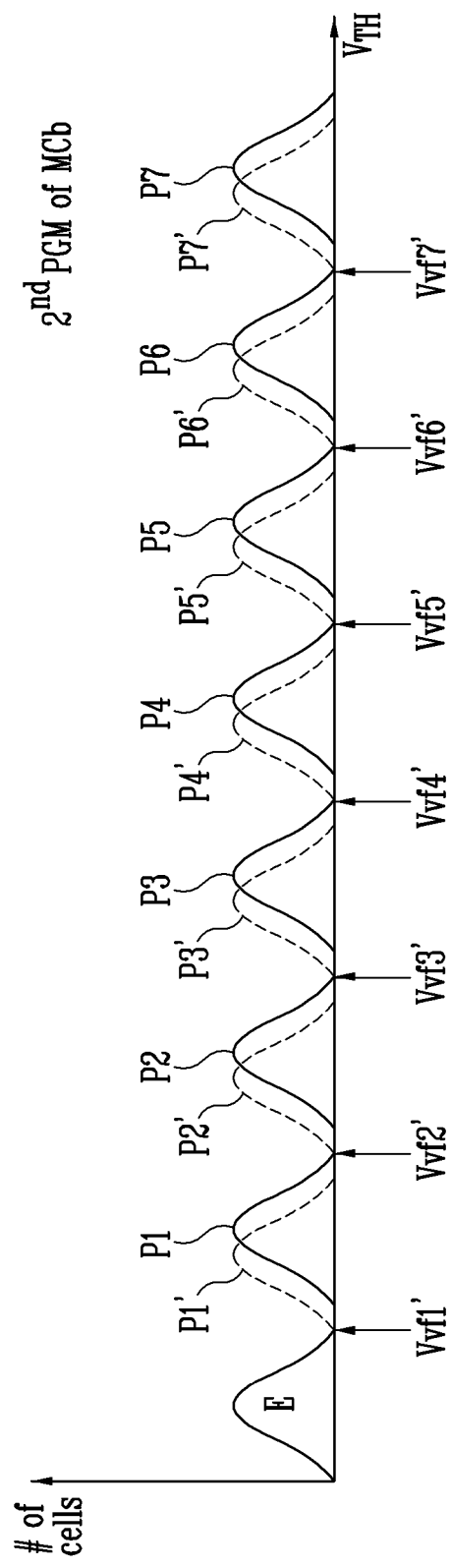

FIGS. 7A, 7B, and 7C are diagrams illustrating a program method of the semiconductor memory device in accordance with an embodiment of the present disclosure.

Referring to FIG. 7A, a threshold voltage distribution of the memory cells connected to an (i+1)th word line WL(i+1) is illustrated. When the first program operation $1^{st}$ PGM, i.e., the foggy program operation is performed on the physical page connected to the (i+1)th word line WL(i+1), a threshold voltage of each of the memory cells connected to the (i+1)th word line WL(i+1) belongs to one of the erase state E and the intermediate state IM.

In accordance with the present disclosure, in the second program operation $2^{nd}$ PGM, i.e., the fine program operation of the memory cells connected to an ith word line WLi, a verify level is differently applied according to the threshold voltage of a corresponding one of the memory cells connected to the (i+1)th word line WL(i+1) located adjacent to the ith word line WLi. As described above, during the second program operation $2^{nd}$ PGM of the memory cells connected to the ith word line WLi, a verify level of memory cell MCb located adjacent to a memory cell programmed to the intermediate state IM becomes low.

To this end, in the second program operation $2^{nd}$ PGM of the memory cells connected to the ith word line WLi, information on a threshold voltage of each of the memory cells connected to the (i+1)th word line WL(i+1) is required. Therefore, an operation of sensing a threshold voltage of each of the memory cells connected to the (i+1)th word line WL(i+1) is required.

Specifically, as shown in FIG. 7A, a threshold voltage of each of the memory cells connected to the (i+1)th word line WL(i+1) is sensed using a reference voltage $R_{REF}$. Accordingly, it can be determined whether the threshold voltage of each of the memory cells connected to the (i+1)th word line WL(i+1) belongs to the erase state E or the intermediate state IM. A result obtained by sensing the threshold voltage of each of the memory cells connected to the (i+1)th word line WL(i+1) may be stored in a latch within a corresponding page buffer.

The reference voltage $R_{REF}$ may be selected as one among various values according to requirements of a design. In an embodiment, the reference voltage $R_{REF}$ may have the same voltage level of the first read voltage R1. In another embodiment, the reference voltage $R_{REF}$ may have the same voltage level of the second read voltage R2. In still another embodiment, the reference voltage $R_{REF}$ may have a voltage level between the first read voltage R1 and the second read voltage R2.

After the threshold voltage of each of the memory cells connected to the (i+1)th word line WL(i+1) is sensed using the reference voltage $R_{REF}$, a verify level used in the second program operation $2^{nd}$ PGM of the memory cell connected to the ith word line WLi may be determined based on the sensing result. Referring to FIG. 7B, a voltage level applied in the second program operation $2^{nd}$ PGM of a memory cell MCa connected to the ith word line WLi, which is adjacent to a memory cell having a threshold voltage corresponding to the erase state E, is illustrated. As described above, in the second program operation $2^{nd}$ PGM of a memory cell having a threshold voltage corresponding to the erase state E, influence of disturb, which is applied to the memory cell MCa, is relatively small. Accordingly, normal verify levels Vvf1 to Vvf7 may be applied to the memory cell MCa connected to the ith word line WLi, which is adjacent to the memory cell having a threshold voltage corresponding to the erase state E. The second program operation $2^{nd}$ PGM using the normal verify levels Vvf1 to Vvf7 is performed, so that memory cells MCa connected to the ith word line WLi, which are adjacent in a bit line direction to the memory cell of the erase state E, maintain the erase state E or are programmed to the first to seventh program states P1 to P7.

Referring to FIG. 7C, a verify level applied in the second program operation $2^{nd}$ PGM of a memory cell MCb connected to the ith word line WLi, which is adjacent to a memory cell having a threshold voltage corresponding to the intermediate state IM, is illustrated. As described above, in the second program operation $2^{nd}$ PGM of a memory cell having a threshold voltage corresponding to the intermediate state IM, influence of disturb, which is applied to the memory cell MCb, is relatively large. Accordingly, auxiliary verify levels Vvf1' t Vvf7', which are lower than the normal verify levels Vvf1 to Vvf7, may be applied to the memory cell MCb connected to the ith word line WLi, which is adjacent to the memory cell having a threshold voltage corresponding to the intermediate state IM. The second program operation $2^{nd}$ PGM using the auxiliary verify levels Vvf1' to Vvf7' is performed, so that memory cells MCb connected to the ith word line WLi, which are adjacent in a bit line direction to the memory cell of the erase state E, maintain the erase state E or are programmed to lowered first to seventh program states P1' to P7' corresponding to the respective auxiliary verify levels Vvf1' t Vvf7'.

After that, in the second program operation $2^{nd}$ PGM of the memory cells connected to the (i+1)th word line WL(i+1), relatively large influence of disturb is applied to the memory cells MCb among the memory cells connected to the ith word line WLi. Accordingly, a threshold voltage of the memory cells MCb may slightly increase in the lowered first to seventh program states P1' to P7'. As a result, a threshold voltage distribution of the memory cells MCb can become close to the first to seventh program state P1 to P7.

Figure 8:
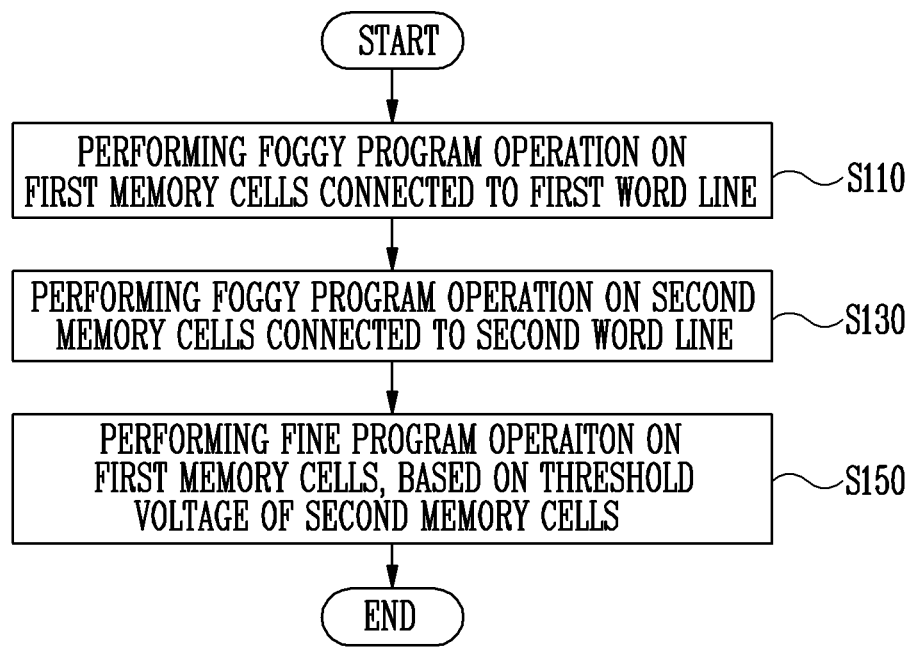
FIG. 8 is a flowchart illustrating an operating method of the semiconductor memory device in accordance with an embodiment of the present disclosure.

FIG. 8 is a flowchart illustrating an operating method of the semiconductor memory device in accordance with an embodiment of the present disclosure.

Referring to FIG. 8, the operating method of the semiconductor memory device in accordance with the embodiment of the present disclosure includes operation S110 of performing a foggy program operation on first memory cells connected to first word line, operation S130 of performing a foggy program operation on second memory cells connected to a second word line, and operation S150 of performing a fine program operation on the first memory cells, based on threshold voltages of the second memory cells.

The operation S110 may correspond to a first program operation $1^{st}$ PGM on a physical page connected to an ith word line WLi. The first word line may correspond to the ith word line WLi shown in FIG. 6.

The operation S130 may correspond to a first program operation $1^{st}$ PGM on a physical page connected to an (i+1)th word line WL(i+1). The second word line may correspond to the (i+1)th word line WL(i+1) shown in FIG. 6. That is, the second word line is located adjacent to the first word line.

Therefore, each of the first memory cells connected to the first word line is located, in a bit line direction, adjacent to a corresponding memory cell among the second memory cells connected to the second word line.

The operation S150 may correspond to a second program operation $2^{nd}$ PGM on the physical page connected to the ith word line WLi. In an embodiment, for the second program operation $2^{nd}$ PGM on the physical page connected to the ith word line WLi, an operation of sensing a threshold voltage of each of the memory cells connected to the (i+1)th word line WL(i+1) may be required.

Although not shown in FIG. 8, the operating method of the semiconductor memory device in accordance with the embodiment of the present disclosure may further include an operation of performing a fine program operation on the second memory cells after the operation S150. More specifically, the operating method of the semiconductor memory device in accordance with the embodiment of the present disclosure may further include an operation of performing a foggy program operation on third memory cells connected to a third word line after the operation S150 and performing a fine program operation on the second memory cell, based on threshold voltages of the third memory cells.

Figure 9:
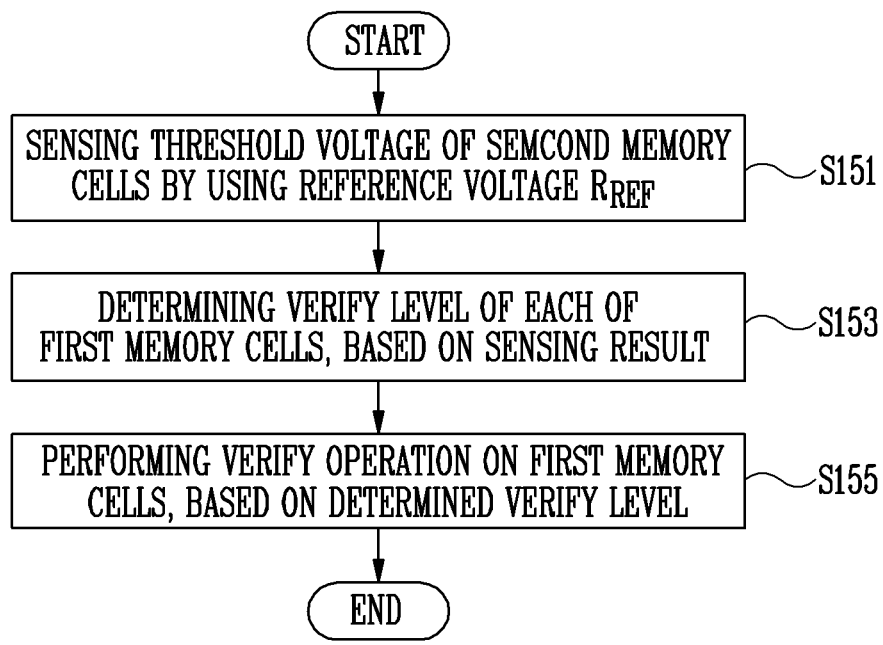
FIG. 9 is a flowchart illustrating an operation S150 shown in FIG. 8 in accordance with an embodiment of the present disclosure.

FIG. 9 is a flowchart illustrating the operation S150 shown in FIG. 8 in accordance with an embodiment of the present disclosure.

Referring to FIG. 9, the operation S150 shown in FIG. 8 includes operation S151 of sensing a threshold voltage of each of the second memory cells by using a reference voltage $R_{REF}$, operation S153 of determining a verify level of each of the first memory cells, based on a sensing result, and operation S155 of performing a verify operation on a corresponding one of the first memory cells, based on the determined verify level. Here, the first memory cells may be adjacent to the respective second memory cells in a bit line direction.

In the operation S151, a threshold voltage of each of the second memory cells, i.e., the memory cells connected to the (i+1)th word lines WL(i+1) is sensed using the reference voltage $R_{REF}$ as described with reference to FIG. 7A. Through the operation S151, it may be determined whether a threshold voltage of each of the memory cells connected to the (i+1)th word lines WL(i+1) belongs to the erase state E or the intermediate state IM. In the operation S151, a result obtained by sensing the threshold voltage of each of the memory cells connected to the (i+1)th word lines WL(i+1) may be stored in a latch within a corresponding page buffer.

In the operation S153, a verify level of each of the first memory cells located adjacent to the second memory cells is determined according to the threshold voltage of a corresponding one of the second memory cells. As described above, normal verify levels Vvf1 to Vvf7 are applied to a first memory cell located adjacent to a second memory cells having a threshold voltage corresponding to the erase state E. On the other hand, auxiliary verify levels Vvf1' to Vvf7' are applied to a first memory cell located adjacent to a second memory cell having a threshold voltage corresponding to the intermediate state IM.

In the operation S155, a verify operation on each of the first memory cells, i.e., memory cells connected to the ith word line WLi is performed based on the determined verify level. In an embodiment, the verify operation may be performed twice in the operation S155. For example, in verification of the first program state P1, a verify operation using the first verify level Vvf1 and a verify operation using the auxiliary first verify level Vvf1' may be performed. More specifically, a verify operation on memory cells MCa may be performed in a state in which a voltage of the first verify level Vvf1 is applied to the ith word line WLi. After that, a verify operation on memory cells MCb may be performed in a state that a voltage of the auxiliary first verify level Vvf1' is applied to the ith word line WLi.

In another embodiment, the verify operations on the memory cells MCa and the memory cells MCb may be simultaneously performed. An embodiment in which the verify operations on the memory cells MCa and the memory cells MCb are simultaneously performed will be described later with reference to FIG. 11.

Although not shown in FIG. 9, the operation S150 may further include an operation of applying a program voltage to the first word line connected to the first memory cells.

Figure 10:
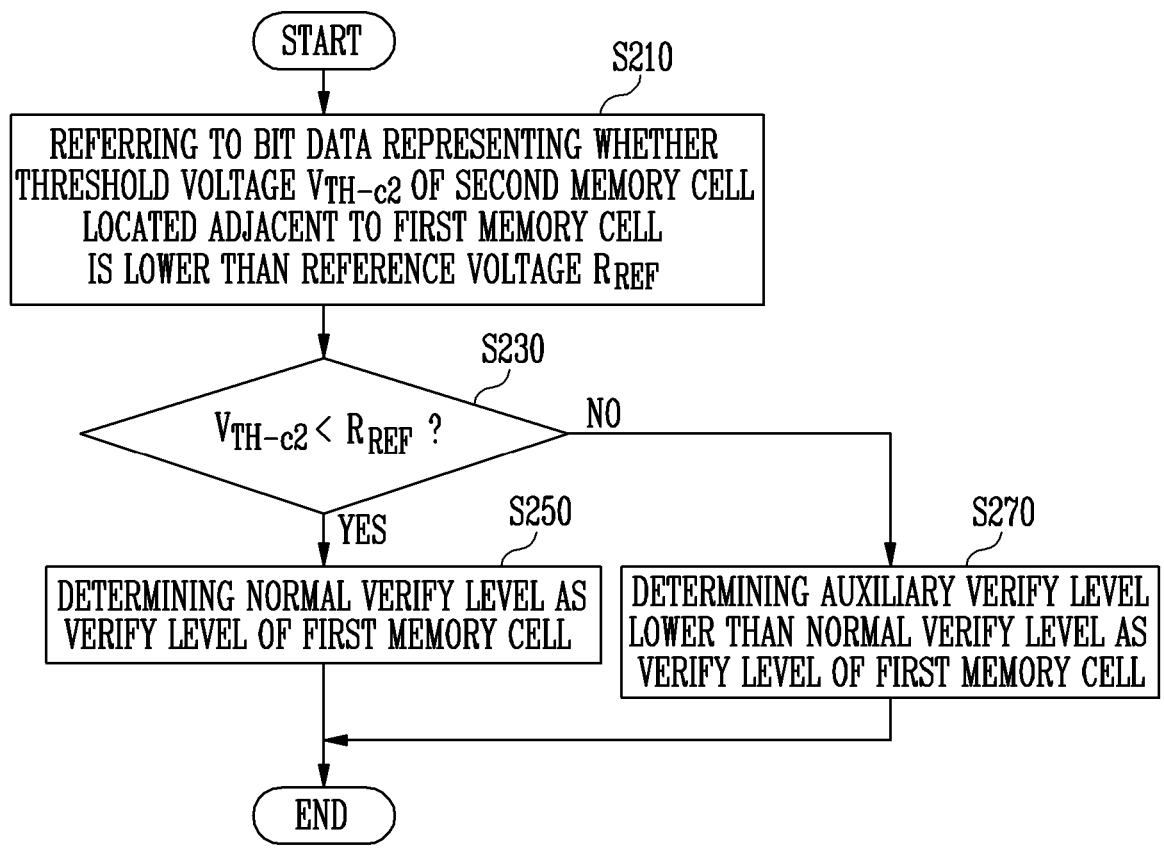
FIG. 10 is a flowchart illustrating an operation S153 shown in FIG. 9 in accordance with an embodiment of the present disclosure.

FIG. 10 is a flowchart illustrating the operation S153 shown in FIG. 9 in accordance with an embodiment of the present disclosure. Referring to FIG. 10, a method of determining a verify level of one of the first memory cells is illustrated.

More specifically, the method of determining a verify level of a first memory cell includes operation S210 of referring to bit data representing whether a threshold voltage $V_{TH-c2}$ of a second memory cell located adjacent to the first memory cell is lower than the reference voltage $R_{REF}$, operation S250 of determining a normal verify level as the verify level of the first memory cell when the threshold voltage $V_{TH-c2}$ of the second memory cell located adjacent to the first memory cell is lower than the reference voltage $R_{REF}$ (YES in operation S230), and operation S270 of determining an auxiliary verify level lower than the normal verify level as the verify level of the first memory cell.

As described above, in the operation S151 shown in FIG. 9, bit data representing the result obtained by sensing the threshold voltage of each of the memory cells connected to the (i+1)th word line WL(i+1) may be stored in a latch within a corresponding page buffer. For example, when it is determined that the threshold voltage of a selected one of the memory cells connected to the (i+1)th word line WL(i+1) is lower than the reference voltage $R_{REF}$, bit data of "1" may be stored in the latch within the corresponding page buffer. In addition, when it is determined that the threshold voltage of a selected one of the memory cells connected to the (i+1)th word line WL(i+1) is higher than or equal to the reference voltage $R_{REF}$, bit data of "0" may be stored in the latch within the corresponding page buffer.

In the operation S210, the bit data stored in the operation S151 is referenced. Accordingly, it can be determined whether the threshold voltage of the second memory cell located adjacent to the first memory cell is lower than the reference voltage $R_{REF}$.

As a result obtained by referring to the operation S210, when it is determined that the threshold voltage of the second memory cell located adjacent to the first memory cell is lower than the reference voltage $R_{REF}$ (YES in the operation S230), the first memory cell adjacent to the second memory cell corresponds to the memory cell MCa shown in FIG. 6. Therefore, a normal verify level is determined as the verify level of the first memory cell. The normal verify levels Vvf1 to Vvf7 are determined as the verify levels of the first memory cell.

As a result obtained by referring to the operation S210, when it is determined that the threshold voltage of the second memory cell located adjacent to the first memory cell is greater than or equal to the reference voltage $R_{REF}$ (NO in the operation S230), the first memory cell adjacent to the second memory cell corresponds to the memory cell MCb shown in FIG. 6. Therefore, an auxiliary verify level is determined as the verify level of the first memory cell. As described above, the auxiliary verify levels Vvf1' to Vvf7' are determined as the verify levels of the first memory cell.

After that, in the operation S155 shown in FIG. 9, a verify operation on each of the first memory cells may be performed based on the determined verify level.

Figure 11:
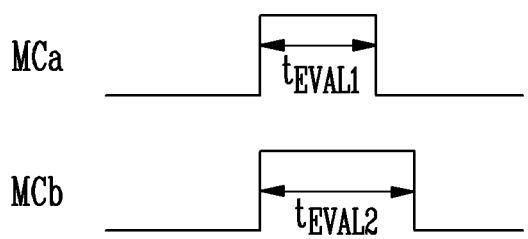
FIG. 11 is a diagram illustrating simultaneously performing a verify operation using a normal verify level and a verify operation using an auxiliary verify level in accordance with an embodiment of the present disclosure.

FIG. 11 is a diagram illustrating simultaneously performing a verify operation using a normal verify level and a verify operation using an auxiliary verify level in accordance with an embodiment of the present disclosure. Referring to FIG. 11, an evaluation time of a memory cell MCa to which the normal verify level is applied in a verify operation and an evaluation time of a memory cell MCb to which the auxiliary verify level is applied in a verify operation are illustrated. An evaluation time may be a time applied to an evaluation operation of evaluating a threshold voltage of each of memory cells. An evaluation time used in a verify operation of a memory cell is widely known in the art to which the present disclosure pertains, and therefore, its additional descriptions will be omitted.

In a verify operation of a memory cell connected to the ith word line WLi, a voltage having the normal verify level is applied to the ith word line WLi. In a verify operation of the memory cells connected to the ith word line WLi, a second evaluation time $t_{EVAL2}$ applied to a page buffer connected to the memory cell MCb is longer than a first evaluation time $t_{EVAL1}$ applied to a page buffer connected to the memory cell MCa.

In a verify operation of a memory cell, a tendency that the memory cell having the same threshold voltage is determined as an off-cell from an on-cell becomes higher as the evaluation time becomes longer. That is, when the relatively long second evaluation time $t_{EVAL2}$ is applied, this results in substantially the same effect as when the auxiliary verify level lower than the normal verify level is applied to a word line connected to the memory cell MCb. Accordingly, without performing a verify operation of applying the normal verify level to the ith word line WLi and a verify operation of applying the auxiliary verify level to the ith word line WLi, the normal verify level is applied to the ith word line WLi, and only the evaluation time is differently applied. Thus, this results in the same effect as that different verify levels are applied.

Therefore, in the operation S155, the first evaluation time $t_{EVAL1}$ is applied to a page buffer of a first memory cell adjacent to a second memory cell having a threshold voltage corresponding to the erase state E, and the second evaluation time $t_{EVAL2}$ longer than the first evaluation time $t_{EVAL1}$ is applied to a page buffer of a first memory cell adjacent to a second memory cell having a threshold voltage corresponding to the intermediate state IM. Accordingly, the first memory cells can be verified using different verify levels through a one-time verify operation.

Referring to FIGS. 8 and 9, the threshold voltage sensing operation S151 for checking states, to which the threshold voltages of the second memory cells correspond, in the fine program operation of the first memory cells is performed. This results from an increase in time required to perform the fine program operation of the first memory cells.

In accordance with an embodiment of the present disclosure, in the operation S130 of performing the foggy program operation on the second memory cells, reference bit data representing whether a target program state of each of the second memory cells is an upper state, is generated based on bit data for programming the second memory cells. After that, in the operation S130 of performing the fine program operation of the first memory cells, verify levels to be respectively applied to the first memory cells are determined based on the reference bit data of the respective second memory cells adjacent to the respective first memory cells, without performing any threshold voltage sensing operation on the respective second memory cells. Since the threshold voltage sensing operation for checking states, to which the threshold voltages of the second memory cells correspond, is omitted in the fine program operation on the first memory cells, the time required to perform the fine program operation on the first memory cells can be reduced. Hereinafter, this will be described with reference to FIGS. 12 to 15C.

FIG. 12 is a flowchart illustrating the operation S130 shown in FIG. 8 in accordance with an embodiment of the present disclosure. Specifically, an operation of performing a foggy program operation on one of the second memory cells connected to the second word line is illustrated in FIG. 12.

Referring to FIG. 12, the operation S130 of performing the foggy program operation on the second memory cells connected to the second word line includes operation S131 of storing a plurality of bit data for programming a second memory cell in data latches of a page buffer, operation S133 of generating reference bit data representing whether a target program state of the second memory cell is an upper state, based on the bit data stored in the data latches, and operation S135 of storing the reference bit data in an extra latch.

In the operation S131, bit data for programming a second memory cell are stored in data latches of a page buffer connected to the second memory cell through a bit line. In a program operation of the TLC mode, three bit data, i.e., a Least Significant Bit (LSB), a Central Significant Bit (CSB), and a Most Significant Bit (MSB), which are used to program the second memory cell, may be stored in the data latches of the page buffer.

In the operation S133, reference bit data representing whether a target program state of the second memory cell is an upper state may be generated based on the bit data stored in the data latches of the page buffer. Embodiments in which the reference bit data representing whether the target program state of the second memory cell is an upper state is generated based on the bit data stored in the data latches of the page buffer will be described with reference to FIGS. 15A to 15C.

In the operation S135, the generated reference bit data may be stored in an extra latch. The reference bit data stored in the extra latch is continuously maintained even after the foggy program operation on the second memory cells is completed. That is, the reference bit data stored in the extra latch may be used to determine a verify level of a corresponding one of the first memory cells in the fine program operation on the corresponding first memory cell. To this end, the reference bit data stored in the extra latch may be maintained until the verify level of the corresponding first memory cell is determined.

Although not shown in FIG. 12, the operation S130 may include an operation of applying a program voltage to the second word line connected to the second memory cells. In accordance with an embodiment of the present disclosure, an operation of generating the reference bit data and storing the reference bit data in the extra latch may be substantially simultaneously performed with the operation of applying the program voltage to the second word line. Therefore, any additional time for performing the operations S133 and S155 may not be required during the foggy program operation on the second memory cells.

In accordance with an embodiment of the present disclosure, the operation of generating the reference bit data and storing the reference bit data in the extra latch may substitute for the operation S151 of sensing the threshold voltage of each of the second memory cells by using the reference voltage $R_{REF}$, which is shown in FIG. 9. Accordingly, the time required to perform the fine program operation on the first memory cells can be reduced.

FIG. 13 is a flowchart illustrating the operation S150 shown in FIG. 8 in accordance with an embodiment of the present disclosure.

Referring to FIG. 13, the operation S150 may include operation S152 of determining a verify level of each of the first memory cells by referring to reference bit data stored in an extra latch of a corresponding one of page buffers and operation S154 of performing a verify operation on the first memory cell, based on the determined verify level. The operation S154 shown in FIG. 13 may be substantially identical to the operation S155 shown in FIG. 9. Therefore, overlapping descriptions of the operation S154 will be omitted.

In the operation S152, a verify level of each of the first memory cells is determined by referring to the reference bit data stored in the extra latch through the operation S135 shown in FIG. 12. The operation S152 may be performed similarly to the method shown in FIG. 10. That is, whether a target program state of each of the second memory cells is an upper state may be determined by referring to the reference bit data stored in the extra latch. When the target program state of a second memory cell is a lower state, a verify level to be applied to a first memory cell located adjacent to the second memory cell becomes a normal verify level. On the other hand, when the target program state of a second memory cell is an upper state, a verify level to be applied to a first memory cell located adjacent to the second memory cell becomes an auxiliary verify level lower than the normal verify level.

Referring to FIG. 13, unlike FIG. 9, the sensing operation for determining whether the threshold voltage of each of the second memory cells is higher than the reference voltage $R_{REF}$ is not performed. Thus, the time required to perform the fine program operation on the first memory cells can be reduced.

Figures 14, 15A:
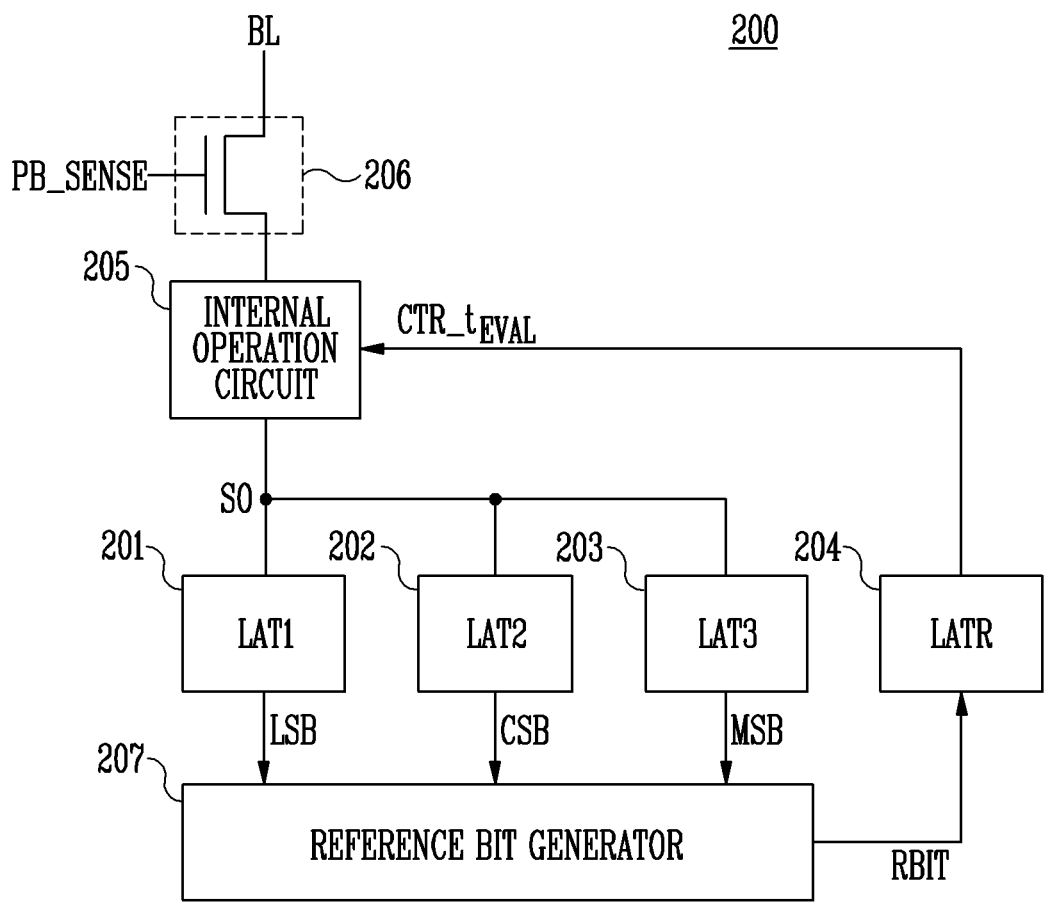

FIG. 14 is a block diagram illustrating one of a plurality of page buffers included in the semiconductor memory device in accordance with an embodiment of the present disclosure.

Referring to FIG. 14, a page buffer 200 may include a plurality of data latches 201, 202, and 203 for storing program data input from the outside in a program operation. For example, in the embodiment shown in FIG. 14, the page buffer 200 may store 3-bit program data. A data latch LAT1 201 may store a Least Significant Bit (LSB), a data latch LAT2 202 may store a Central Significant Bit (CSB), and a data latch LAT3 203 may store a Most Significant Bit (MSB).

The page buffer 200 may also include an internal operation circuit 205 for performing a read operation and a program operation. The internal operation circuit 205 may be connected to the data latches 201, 202, and 203 through a node SO. In the program operation of the semiconductor memory device, the internal operation circuit 205 may program a memory cell connected to a bit line BL, based on program data stored in the data latches LAT1, LAT2, and LAT3. Also, in the read operation of the semiconductor memory device, the internal operation circuit 205 may read data stored in the memory cell connected to the bit line BL and store the read data in the data latches LAT1, LAT2, and LAT3.

The internal operation circuit 205 may be designed in various manners, if necessary. Various embodiments of the internal operation circuit 205 constituting the page buffer 200 are widely known in the art to which the present disclosure pertains, and therefore, their descriptions will be omitted.

The page buffer 200 may include a bit line connection transistor 206 for controlling a connection between the bit line BL and the internal operation circuit 205. The bit line connection transistor 206 is controlled by a bit line connection signal PB_SENSE.

Also, the page buffer 200 may further include a reference bit generator 207 and an extra latch LATR 204. During a foggy program operation of a second memory cell, the reference bit generator 207 may generate reference bit data RBIT, based on the LSB, CSB, and MSB, which are provided from the data latches LAT1, LAT2, and LAT3. The reference bit data RBIT represents whether a target program state of the second memory cell connected to the page buffer is an upper state or a lower state. The generated reference bit data RBIT is transferred to the extra latch LATR. In a fine program operation of a first memory cell, the extra latch LATR generates a control signal $CTR\_t_{EVAL}$ for controlling an evaluation time applied in a verify phase of the first memory cell. The control signal $CTR\_t_{EVAL}$ is transferred to the internal operation circuit 205. The internal operation circuit 205 may control the evaluation time applied in the verify phase of the first memory cell, based on the received control signal $CTR\_t_{EVAL}$.

For example, when the reference bit data RBIT stored in the extra latch LATR is "1," this may represent that a target program state of a corresponding second memory cell is a lower state. The extra latch LATR may generate a control signal $CTR\_t_{EVAL}$ having a logic-low voltage value and transfer the control signal $CTR\_t_{EVAL}$ to the internal operation circuit 205. The internal operation circuit 205 may apply a first evaluation time $t_{EVAL1}$ in the verify phase of the first memory cell in response to the control signal $CTR\_t_{EVAL}$ having the logic-low voltage value.

When the reference bit data RBIT stored in the extra latch LATR is "0," this may represent that a target program state of a corresponding second memory cell is an upper state. The extra latch LATR may generate a control signal $CTR\_t_{EVAL}$ having a logic-high voltage value and transfer the control signal $CTR\_t_{EVAL}$ to the internal operation circuit 205. The internal operation circuit 205 may apply a second evaluation time $t_{EVAL2}$ longer than the first evaluation time $t_{EVAL1}$ in the verify phase of the first memory cell in response to the control signal $CTR\_t_{EVAL}$ having the logic-high voltage value.

FIGS. 15A, 15B, and 15C are truth tables illustrating an operation of the reference bit generator 207 in accordance with an embodiment of the present disclosure. In FIGS. 15A to 15C, truth tables based on the gray code described with reference to FIGS. 4A to 4C are illustrated. The reference bit generator 207 may include a logic circuit for calculating a result shown in a truth table shown in any of FIGS. 15A to 15C. A specific method of organizing a logic circuit based on a truth table is widely known in the art to which the present disclosure pertains, and therefore, its descriptions will be omitted.

In an embodiment, the reference bit generator 207 may generate reference bit data RBIT as illustrated in the truth table shown in FIG. 15A. Referring to FIG. 15A, when the target program state of the second memory cell corresponds to the erase state E and the first to third program states P1 to P3, the reference bit data RBIT becomes "1." When the target program state of the second memory cell corresponds to the fourth to seventh program states P4 to P7, the reference bit data RBIT becomes "0." Therefore, in accordance with the embodiment shown in FIG. 15A, lower states become the erase state E and the first to third program states P1 to P3, and upper states become the fourth to seventh program states P4 to P7. The reference bit data RBIT calculated by the truth table shown in FIG. 15A becomes substantially identical to a bit generated as the result obtained by performing the threshold voltage sensing operation on each of the second memory cells, which is described with reference to FIG. 7A. Thus, according to the reference bit generator 207 operated based on the truth table shown in FIG. 15A, the operation of generating the reference bit data and storing the reference bit data in the extra latch can substitute for the operation S151 of sensing the threshold voltage of each of the second memory cells by using the reference voltage $R_{REF}$, which is shown in FIG. 9.

However, the present disclosure is not limited thereto, and upper and lower states may be divided differently from when the erase and intermediate state are divided as a result of the foggy program operation of the second memory cells. For example, referring to FIG. 15B, when the target program state of the second memory cell corresponds to the erase state E and the first to fourth program states P1 to P4, the reference bit data RBIT becomes "1." When the target program state of the second memory cell corresponds to the fifth to seventh program states P5 to P7, the reference bit data RBIT becomes "0." Therefore, in accordance with the embodiment shown in FIG. 15B, lower states become the erase state E and the first to fourth program states P1 to P4, and upper states become the fifth to seventh program states P5 to P7. In another embodiment, in accordance with the embodiment shown in FIG. 15C, lower states become the erase state E and the first and second program states P1 and P2, and upper states become the third to seventh program states P3 to P7. That is, when the reference bit data RBIT is generated in accordance with an embodiment, upper and lower states can be freely divided regardless of the result of the foggy program operation of the second memory cells.

In accordance with the present disclosure, there can be provided a memory device capable of reducing a time required for programming while reducing program disturb.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory device comprising:
   a memory block including a plurality of memory cells;
   a peripheral circuit configured to perform a program operation on selected memory cells among the plurality of memory cells; and
   a control logic configured to control the program operation of the peripheral circuit,
   wherein the peripheral circuit performs the program operation by:
      performing a foggy program operation on first memory cells among the plurality of memory cells, the first memory cells being connected to a first word line;
      performing a foggy program operation on second memory cells among the plurality of memory cells, the second memory cells being connected to a second word line adjacent to the first word line; and
      performing a fine program operation on the first memory cells, based on whether a target program state of each of the second memory cells is an upper state.

2. The memory device of claim 1, wherein each of the foggy program operations on the first and second memory cells includes programming a corresponding memory cell such that a threshold voltage of the corresponding memory cell belongs to one of an erase state and an intermediate state.

3. The memory device of claim 1, wherein the peripheral circuit includes a plurality of page buffers connected to the first and second memory cells through bit lines.

4. The memory device of claim 3, wherein each of the plurality of page buffers is configured to store reference bit data representing whether a target program state of a corresponding second memory cell is an upper state during the foggy program operation on the second memory cells.

5. The memory device of claim 3, wherein each of the plurality of page buffers includes:
   a bit line connection transistor connected to a corresponding bit line;
   an internal operation circuit connected to the bit line connection transistor;

first to N-th data latches connected to the internal operation circuit;
a reference bit generator configured to:
receive data bits from the first to N-th data latches during the foggy program operation of the second memory cells, and
generate, based on the received data bits, reference bit data representing whether a target program state of corresponding second memory cells is an upper state; and
an extra latch configured to store the reference bit data,
wherein 'N' is a natural number of 2 or more.

6. The memory device of claim 5,
wherein the reference bit generator is further configured to generate a control signal based on the reference bit data, and
wherein the internal operation circuit is configured to apply, during a verify operation in the fine program operation on the first memory cells, an evaluation time determined based on the control signal.

7. The memory device of claim 6,
wherein the upper state corresponds to i-th to M-th program states among first to $2^N-1$-th program states sequentially arranged according to a threshold voltage, and
wherein 'M' is a natural number of 3 or more, and 'i' is a natural number of 1 or more and less than 3.

8. The memory device of claim 5,
wherein the extra latch is further configured to generate a control signal having a first level when the reference bit data represents a lower state instead of the upper state, and
wherein the internal operation circuit is configured to apply, in response to the control signal having the first level, a first evaluation time during a verify operation in the fine program operation on the first memory cells adjacent to the corresponding second memory cells.

9. The memory device of claim 5,
wherein the extra latch is further configured to generate a control signal having a second level when the reference bit data represents the upper state, and
wherein the internal operation circuit is configured to apply, in response to the control signal having the second level, a second evaluation time longer than a first evaluation time during a verify operation in the fine program operation on the first memory cells adjacent to the corresponding second memory cells.

10. A memory device comprising:
a first page including a first memory cell, the first page being connected to a first word line;
a second page including a second memory cell adjacent to the first memory cell in a bit line direction, the second page being connected to a second word line; and
a page buffer connected to the first and second memory cells through a bit line,
wherein the page buffer is configured to store reference bit data representing whether a target program state of the second memory cell is an upper state during a foggy program operation on the second page.

11. The memory device of claim 10, wherein the page buffer is further configured to apply, to a verify operation on the first memory cell during a fine program operation on the first page, an evaluation time determined based on the reference bit data.

12. The memory device of claim 10, wherein the page buffer is further configured to apply, when the reference bit data represents that the target program state of the second memory cell is a lower state instead of the upper state, a first evaluation time to a verify operation on the first memory cell during a fine program operation on the first page.

13. The memory device of claim 10, wherein the page buffer is further configured to apply, when the reference bit data represents that the target program state of the second memory cell is the upper state, a second evaluation time longer than a first evaluation time to a verify operation on the first memory cell during a fine program operation on the first page.

14. The memory device of claim 10,
wherein the upper state corresponds to i-th to M-th program states among first to $2^N-1$-th program states sequentially arranged according to a threshold voltage, and
wherein 'N' is a natural number of 2 or more, 'M' is a natural number of 3 or more, and 'i' is a natural number of 1 or more and less than 3.

15. A method of operating a memory device, the method comprising:
performing a foggy program operation on a first memory cell connected to a first word line;
performing a foggy program operation on a second memory cell connected to a second word line adjacent to the first word line; and
performing a fine program operation on the first memory cell based on whether a target program state of the second memory cell is an upper state.

16. The method of claim 15, wherein the performing of the foggy program operation on the first memory cell includes programming the first memory cell such that a threshold voltage of the first memory cell belongs to one of an erase state and an intermediate state.

17. The method of claim 15, wherein the performing of the foggy program operation on the second memory cell includes:
programming the second memory cell such that a threshold voltage of the second memory cell belongs to one of the erase state and the intermediate state; and
generating reference bit data representing whether the target program state of the second memory cell is an upper state.

18. The method of claim 17, wherein the performing of the fine program operation on the first memory cell includes:
determining, based on the reference bit data, a verify level to be applied to the first memory cell; and
performing a verify operation of the first memory cell based on the determined verify level.

19. The method of claim 18, wherein the determining the verify level includes determining a normal verify level as the verify level to be applied to the first memory cell in response to a decision that the target program state of the second memory cell is a lower state instead of the upper state as a reference result of the reference bit data.

20. The method of claim 18, wherein the determining the verify level includes determining an auxiliary verify level lower than a normal verify level as a verify level to be applied to the first memory cell in response to a decision that the target program state of the second memory cell is the upper state as a reference result of the reference bit data.

21. The method of claim 20, wherein the performing the verify operation includes performing an evaluation operation for a first time amount to sense a threshold voltage of the first memory cell when a normal verify level is determined to be applied to the first memory cell.

22. The method of claim 20, wherein the performing the verify operation includes performing an evaluation operation for a second time amount longer than a first time amount to sense a threshold voltage of the first memory cell when the auxiliary verify level is determined to be applied to the first memory cell.

* * * * *